United States Patent
Murphy et al.

(10) Patent No.: US 11,501,617 B2
(45) Date of Patent: Nov. 15, 2022

(54) TEST DEVICE FOR VERIFYING OPERATION OF AN OPTICAL FIBER MONITORING SYSTEM

(71) Applicant: Network Integrity Systems, Inc., Hickory, NC (US)

(72) Inventors: Cary R. Murphy, Hickory, NC (US); David E. Vokey, Sidney (CA); Mark K. Bridges, Hickory, NC (US)

(73) Assignee: Network Integrity Systems, Inc., Hickory, NC (US)

( * ) Notice: Subject to any disclaimer, the term of this patent is extended or adjusted under 35 U.S.C. 154(b) by 269 days.

(21) Appl. No.: 17/089,186

(22) Filed: Nov. 4, 2020

(65) Prior Publication Data
US 2022/0084377 A1   Mar. 17, 2022

Related U.S. Application Data
(63) Continuation-in-part of application No. 17/018,535, filed on Sep. 11, 2020.

(51) Int. Cl.
| | | |
|---|---|---|
| *H04B 17/00* | (2015.01) | |
| *G08B 13/186* | (2006.01) | |
| *G02B 6/44* | (2006.01) | |
| *H04B 10/071* | (2013.01) | |

(52) U.S. Cl.
CPC ......... *G08B 13/186* (2013.01); *G02B 6/4469* (2013.01); *H04B 10/071* (2013.01)

(58) Field of Classification Search
CPC ... G08B 13/186; G02B 6/4469; H04B 10/071
USPC .......................................................... 398/28
See application file for complete search history.

(56) References Cited

U.S. PATENT DOCUMENTS
| | | | |
|---|---|---|---|
| 5,384,635 A | 1/1995 | Cohen | |
| 5,703,682 A | 12/1997 | Eslambolchi | |
| 7,142,737 B1 | 11/2006 | Murphy | |
| 7,706,641 B2 | 4/2010 | Murphy | |
| 9,621,262 B1 | 4/2017 | Timmins | |
| 11,271,642 B1 * | 3/2022 | Ponchon | ............ G01M 11/3136 |
| 2005/0254038 A1 | 11/2005 | Harres | |

(Continued)

FOREIGN PATENT DOCUMENTS
| | | |
|---|---|---|
| CN | 103926061 | 7/2014 |
| CN | 104240455 | 8/2016 |

(Continued)

*Primary Examiner* — Mohammad R Sedighian
(74) *Attorney, Agent, or Firm* — Adrian D. Battison; Ade & Company Inc.; Ryan W. Dupuis

(57) ABSTRACT

In an optical fiber monitoring system which detects physical disturbance or other parameters such as temperature or strain of a fiber where a monitor signal is transmitted along the optical fiber and analyzed to detect changes which are indicative of an event, a method is provided for periodically checking proper operation of the optical fiber monitoring system. A fiber disturbance actuator periodically causes a pattern of disturbances of a portion of the fiber at a predetermined location thereon where the disturbance is characteristic of the event to be monitored. The monitor signal is analyzed to detect the pattern of changes and in the event that expected changes are not detected, a warning is issued that the intrusion detection system is not properly operating.

33 Claims, 21 Drawing Sheets

(56) References Cited

U.S. PATENT DOCUMENTS

| | | |
|---|---|---|
| 2007/0086694 A1 | 4/2007 | Murphy |
| 2010/0284000 A1 | 11/2010 | Xu |
| 2013/0188177 A1 | 7/2013 | Lovely |
| 2014/0368809 A1 | 12/2014 | Chen |
| 2016/0327436 A1 | 11/2016 | Tur |
| 2017/0067335 A1 | 3/2017 | Weng |
| 2018/0292240 A1 | 10/2018 | Liu |
| 2019/0074896 A1 | 3/2019 | Murphy |
| 2021/0278314 A1 | 9/2021 | Xia |

FOREIGN PATENT DOCUMENTS

| | | | |
|---|---|---|---|
| GB | 2317008 | 3/1998 | |
| JP | 2007121090 | 5/2007 | |
| JP | 2009014546 | 1/2009 | |
| JP | 2018-504603 A * | 2/2018 | ............... G01V 8/16 |
| JP | 2018048917 | 3/2018 | |
| KR | 20090087590 | 8/2009 | |
| KR | 101574198 | 12/2015 | |
| WO | WO2005010562 | 2/2005 | |
| WO | WO2014035303 | 3/2014 | |
| WO | WO 2020/113323 A1 * | 6/2020 | ............. G01D 18/00 |

* cited by examiner

TEST DEVICE FOR VERIFYING OPERATION OF AN OPTICAL FIBER MONITORING SYSTEM

This application is a continuation in part application of application Ser. No. 17/018,535 filed Sep. 11, 2020.

This application relates to a test device for periodically, or on demand, checking and verifying proper operation of a monitoring system of an optical fiber.

BACKGROUND OF THE INVENTION

Optical fiber is used for many types of monitoring applications, including but not limited to perimeter security, network security, structural monitoring.

Typically the fiber concerned is monitored using a method which includes transmitting from a source of light at a transmit location a monitor signal along the optical fiber, receiving the monitor signal after transmission along the fiber, analyzing the monitor signal after transmission along the fiber to detect changes therein and generating an alarm in response to the detected changes.

In regard to communications networks, the monitor system is responsive to vibration, motion, or handling of the fiber which are indicative of an intrusion attempt on the fiber.

In addition, the invention herein can be used for fence and buried perimeter protection systems where a fiber is mounted on or at the item to be secured so that again the fiber is monitored for vibration or motion of the fiber caused by attempts to access or penetrate the item concerned.

Yet further, the invention herein can be used for other fibers used for monitoring forces on the fiber caused by strain or other forces that monitor bridge or building integrity. These can include stretching or compression of the fiber. In this case the monitor Is not looking for transverse vibration or movement of the fiber from an intrusion attempt or other handling but is instead looking for changes in the character of the fiber caused by the application of the forces to the fiber. Such arrangement can be used in strain gauges, building and bridge monitoring systems and the like.

Additionally, the invention herein can be used to monitor temperature, strain, and pressure using sensors in wells and down-hole applications. Such methods require a looped fiber to accommodate the inability to place equipment in wells or down holes.

Additionally, the invention herein can be used to monitor fibers distributed throughout a so-called 'smart city" type application. In these instances, fibers are distributed to monitor traffic patterns, weather, electrical distribution, and seismic activity.

In all cases the change in the parameter to be measured causes a change in a characteristic in the fiber which can be measured using known techniques.

One method for monitoring a communications network cable is to use fibers that are internal to the protected cable. This so-called "intrinsic monitoring" is shown in U.S. Pat. No. 7,706,641 issued Apr. 27, 2010 to the present applicant, the disclosure of which is incorporated herein by reference.

The optical fibers can be monitored using a variety of detection techniques including:

Modal metric, where changes in a modal power distribution in a multimode fiber are detected as shown in U.S. Pat. No. 7,092,586 issued Aug. 15, 2006 to the present applicant, the disclosure of which is incorporated herein by reference.

Attenuation, where simply an attenuation in the monitoring signal received is measured.

Optical Time Domain Reflectometer (OTDR) where reflections or localized attenuations from components of the fiber are detected.

Distributed sensing (DAS/DSS/DTS):

DAS—Distributed Acoustic Sensing where vibrations and displacements cause localized shifts in the path length of the optical fiber. This is detected by a high precision optical Time Domain Reflectometer (OTDR). This OTDR is often referred to as a Phase-OTDR or φ-OTDR, and measures changes in the distance between points of Rayleigh backscatter.

DSS—Distributed Strain Sensing—where strain is measured along a fiber due to tensile or compressive displacements, compression, or cracks. Typically measured using Brillouin OTDR, transmitted light and scattered light are mixed as a heterodyne receiver. This Brillouin frequency shift is proportional to strain and temperature in the fiber.

DTS—Distributed Temperature Sensor—where temperature is measured along an optical fiber including by use of Raman OTDR. Light propagating down the fiber at two wavelengths cause Stokes and anti-Stokes light. The amplitude of light reflected back to the detector in a similar fashion to Rayleigh Backscattering in a traditional OTDR, is highly dependent on temperature. The ratio of Stokes and anti-Stokes light indicates temperature, while the round trip transit time indicates location. As with DSS, Brillouin OTDR can also be used to measure distributed temperature.

Polarization monitoring, where changes in a polarization in the signal in a single mode fiber are detected as shown in U.S. Pat. No. 7,142,737 issued Nov. 28, 2006 to the present applicant, the disclosure of which is incorporated herein by reference.

Active fiber monitoring, where monitoring signal and data signal pass on the same fibers as shown in U.S. Pat. No. 7,092,586 issued Aug. 15, 2006 to Vokey et al. and the present applicant, the disclosure of which is incorporated herein by reference.

Strain monitoring such as strain gauge where a Fiber Bragg Grating, strain gauge or DSS monitors a fiber or mechanical structure, disturbance will be stretching or compression Interferometry such as the Mach-Zehnder interferometers used for network and perimeter monitoring. These may be zone based, or locating by use of bidirectional differential time of flight systems.

Each of these methods of monitoring exploit a specific attribute of the fiber—be it loss, rotation of state of polarization, Rayleigh scattering, or others.

In some cases a single fiber is monitored with typically the transmission at one end and the monitoring at the other or same end. However other arrangements can be used in the present invention including for example the loop type network shown for example in U.S. Pat. No. 7,142,737 issued Nov. 28, 2006 to the present applicant, the disclosure of which is incorporated herein by reference Often these systems are placed into service, but continued viability and availability should be verified. Accordingly, an intelligent, automatic test is needed that does not interfere with or disrupt the actual performance of the monitoring fiber. The test should exercise the entire system, including perturbation detection, alarm generation, response to alarm, and alarm logging. Thus, it is desirable to create a controlled and characterized event on the monitor fiber structure itself to test the entire system and responses.

One existing arrangement for this function is provided by the StopLight (trademark) available from CyberSecure IMS. This test is implemented by passing the monitoring fiber in a secure network through an optical shutter that simply shuts off transmission of the light to the fiber. At the appropriate time, scheduled, spontaneous, or random, the optical shutter opens the circuit, causing the monitoring equipment to register an alarm. This method is accepted in the industry, although a shortcoming is that the monitoring is "blind" during this short period of testing. This adds the vulnerability of an inside threat, cognizant of the blind period, which could act to switch the monitored fibers with a substitute fiber or fiber pair. The system owners would then operate under the belief that the system was secure, although in fact it is no longer monitored.

SUMMARY OF THE INVENTION

According to a first aspect of the invention there is provided a method for operation of an optical fiber monitoring system comprising:

using a detection system to detect changes in an optical fiber caused by one or more events on the fiber by:

transmitting from a source of light at a transmit location a monitor signal along the optical fiber;

receiving the monitor signal after transmission along the fiber;

analyzing the monitor signal after transmission along the fiber to detect changes therein caused by the event to be monitored;

and generating an alarm in response to said detected changes which are indicative of an event;

generating a waveform which is arranged to trigger an alarm;

and periodically optically injecting a test signal corresponding to said waveform into the fiber to test operation of the detection system.

According to a second aspect of the invention there is provided a method for operation of an optical fiber monitoring system comprising:

using a detection system to detect changes in an optical fiber caused by one or more events on the fiber by:

transmitting from a source of light at a transmit location a monitor signal along the optical fiber;

receiving reflected signals after transmission along the fiber;

analyzing the reflected signals after transmission along the fiber to detect an event to be monitored and to detect by timing of the reflected signals a location of the event along the fiber;

and periodically optically injecting a test signal into the fiber to test operation of the detection system;

wherein the test signal is injected at a time selected to appear as an event at a predetermined location on the fiber.

In one embodiment the test signal is injected at a time selected relative to the pulse of the monitor signal to appear as a reflection at a predetermined location on the fiber.

In one embodiment the test signal is injected at a far end of the fiber and wherein there is provided a communication system for actuating timing of the test signal injection.

In one embodiment the test signal is injected at a remote location of the fiber and wherein there is provided a receiver at the remote location for detecting a time of transmission of the monitor signal.

The test signal can be injected by being backscattered into the fiber to be monitored or direct injected by a laser.

The test signal can be a wave form which can be for example a sine wave or a complex waveform.

According to another feature of the present invention there is provided a method for verifying operation of an optical fiber monitoring system comprising:

using a detection system to detect changes in an optical fiber caused by an event to be monitored by:

transmitting from a source of light at a transmit location a monitor signal along the optical fiber;

receiving the monitor signal after transmission along the fiber;

analyzing the monitor signal after transmission along the fiber to detect changes therein caused by the event to be monitored;

and generating an alarm in response to said detected changes which are indicative of an event;

and periodically checking proper operation of the optical fiber monitoring system by:

providing a fiber disturbance actuator to cause disturbance of a portion of the fiber at a predetermined location thereon where the disturbance is characteristic of an event to be monitored;

periodically operating the fiber disturbance actuator;

analyzing the monitor signal to detect changes therein caused by said fiber disturbance actuator;

and in the event that expected changes in response to said fiber disturbance actuator are not detected, actuating a warning that the intrusion detection system is not properly operating.

The fiber concerned can be used for transmission of data as a single transmission fiber or as part of a network. Alternatively, the fiber may be used for monitoring movement of or damage to the fiber as part of a perimeter or structure monitoring system where the signal is used to detect the movement or vibrations of the fiber as a part of an intrusion event into the area being monitored.

Preferably the fiber disturbance actuator generates a predetermined pattern of movements which can thus be recognized by a signature associated with the pattern.

Preferably the fiber disturbance actuator generates predetermined periodic displacements to the fiber typically at a predetermined frequency. These displacements can be formed in bursts of a series of spaced envelopes each containing predetermined periodic displacements to the fiber.

Preferably the fiber disturbance actuator generates a modulation frequency which is chosen to be out of band with ambient disturbances.

Preferably the fiber disturbance actuator generates a modulation frequency which provides a duty cycle defining the frequency bursts which is chosen to be dissimilar to natural occurrences.

Preferably the method includes analyzing the monitor signal and adjusting a magnitude of disturbance caused by the fiber disturbance actuator in response to the analysis. This will allow the amplitude of the perturbation to be adjusted to be appropriate to the magnitude of the monitor signal so that the amplitude must be high enough to be detected, but not so high as to interfere with the monitor signal processing. The adjustment can be controlled from any of several locations, including over a network from the monitor end of the fiber, or controlled locally such as a local network, manual adjustment, or serial connection.

The amplitude of the test perturbation can be monitored to detect fiber quality as insertion loss changes or the insertion of a fiber optic tap along the fiber.

The arrangement herein thus provides a system for applying a known disturbance or perturbation on a monitor fiber with the intention of being detected by the monitoring system.

This invention excites the fiber under very specific conditions in order to confirm that the fiber, cable, or structure is being monitored as expected.

In a preferred arrangement, the fiber being monitored includes or has connected as a part an input fiber length for isolation from the monitoring device of any connector reflections caused by connection of the fiber disturbance actuator. In many cases this includes also an exit fiber which again acts for isolation purposes. This isolation provided by the inlet and exit fiber portions is particularly important in the systems which rely on reflection techniques where any such reflections can be orders of magnitude greater than the signals to be detected.

This system including the inlet and exit isolation fiber portions is typically connected to a network and is instructed to commence a test. The internal fiber disturbance actuator is engaged in a pre-determined manner, the signal from which is then recognized by the monitoring device, which in turn registers the test as successful and proves that the fiber being monitored is connected and secure.

In a preferred embodiment, where the monitor equipment is of a type that determines location of the movement rather than simply the existence of the movement, the monitoring system acts to look for a specific location and for a specific signal signature. This will not only ensure the invention is still connected to the monitored fiber, and by applying detection to a very specific location on the fiber it ensures that a substitute fiber is not used to bypass the intended monitored cable.

This system satisfies a number of applications:

Under command from a communicating device such as a data network or serial port, the fiber disturbance actuator can be instructed to activate. When this activation is detected by the monitoring device, satisfaction of periodic health check of the monitoring system is satisfied. This test may be in satisfaction of a formal standard, or as good practice as defined by the user.

The fiber disturbance actuator may have a manual trigger such as a push button, causing a test to initiate. This test might occur immediately or after a predetermined or random time, adding confidence to the test.

The fiber disturbance actuator and the control system operating the actuator can in some cases be configured to initiate tests autonomously; where this might be scheduled or random in occurrence.

The fiber disturbance actuator may be used as a health monitor of the security system. In this embodiment, the control system can initiate a test at a predetermined frequency, verifying the system is functional.

The arrangement can perform periodic connectivity test to confirm the intended fiber is being monitored.

As cited above in U.S. Pat. No. 7,706,641, fiber security products, such as the Interceptor (trademark) product from Network Integrity Systems perform a fiber monitoring function that is zone based. Rather than pinpoint a location, these devices utilize a loop of fiber, and monitor the entire continuous loop as one zone. The arrangement herein is applicable for zone use as well. The fiber disturbance function of the fiber disturbance actuator acts similarly to a location determining product.

In accordance with a further feature of the invention which can be used with any of the above features there is provided a method for verifying operation of an optical fiber monitoring system comprising:
wherein the optical fiber has a first end and a second end;
using a detection system to detect changes in an optical fiber caused by an event to be monitored by:
at the first end of the optical fiber transmitting from a source of light a monitor signal along the optical fiber;
at the second end returning the monitor signal along the fiber to the first end;
at the first end of the optical fiber receiving the monitor signal after transmission along the fiber;
analyzing the monitor signal after transmission along the fiber to detect changes therein caused by the event to be monitored;
and periodically checking proper operation of the optical fiber monitoring system by:
providing an optical shutter at the second end of the fiber;
periodically operating the optical shutter to temporarily terminate transmission of light along the fiber;
and analyzing the monitor signal to detect a termination therein caused by said optical shutter.

In accordance with a further feature of the invention which can be used with any of the above features there is provided a method for verifying operation of an optical fiber monitoring system comprising:
using a detection system to detect changes in an optical fiber caused by an event to be monitored by:
transmitting from a source of light at a transmit location a monitor signal along the optical fiber;
receiving the monitor signal after transmission along the fiber;
and analyzing the monitor signal after transmission along the fiber to detect changes therein caused by the event to be monitored;
and periodically checking proper operation of the optical fiber monitoring system by:
at a predetermined location on the fiber periodically operating an actuator to cause a disturbance which changes the monitor signal in the fiber;
analyzing the monitor signal to detect changes therein caused by said disturbance;
and in the event that expected changes in response to said disturbance are not detected, actuating a warning that the intrusion detection system is not properly operating;
wherein an instruction signal is communicated along the fiber to the actuator to effect said operating of the actuator and there is provided a coupler on the fiber to extract the instruction signal from other signals in the fiber.

In accordance with a further feature of the invention which can be used with any of the above features there is provided a method for verifying operation of an optical fiber monitoring system:
wherein the system comprises a first fiber and a second fiber;
each of the first and second fibers extending from a transmit location to a remote location and returning along a continuous optical path to the transmit location;
each of the first and second fibers defining first and second ends at the transmit location thus defining outward and return portions of the fiber;
the method comprising:
using a detection system to detect changes in an optical fiber caused by an event to be monitored by:
transmitting from at least one source of light at the transmit location into the first and second ends of each of the first and second fibers monitor signals so as to travel along the optical fiber;

receiving the monitor signals after transmission along the fibers;

analyzing the monitor signals after transmission along the fiber to detect changes therein caused by disturbances on the fiber;

and periodically checking proper operation of the optical fiber monitoring system by:

at a predetermined location on the first and second fibers periodically operating an actuator to cause a disturbance which changes the monitor signal in the fiber;

analyzing the monitor signal to detect changes therein caused by disturbance;

and in the event that expected changes in response to said disturbance are not detected, actuating a warning that the intrusion detection system is not properly operating.

In accordance with a further feature of the invention which can be used with any of the above features there is provided a method for monitoring an optical fiber comprising:

transmitting from a source of light at a transmit location a monitor signal along the optical fiber;

receiving the monitor signal after transmission along the fiber;

analyzing the monitor signal after transmission along the fiber to detect changes therein caused by disturbances on the fiber;

and periodically generating disturbances in the fiber by generating longitudinal forces in the fiber at one location along the length relative to another location along the length so as to cause changes in length of the fiber between the first and second locations.

In one specific arrangement, the disturbances can be generated by a longitudinally moving anchor located between two stationary anchors.

In one specific arrangement, the disturbances can be generated by a by wrapping the fiber around a support to form two adjacent lengths and commonly generating said longitudinal forces in said adjacent lengths.

In one embodiment for causing the longitudinal forces the support comprises a stationary anchor around which the fiber is wrapped and there is provided a longitudinally moving anchor movable towards and away from the stationary anchor. As detection systems monitor interference within the fiber, and therefor may exhibit points of constructive and destructive interference (nulls), it can be desirable to excite more than a single point along the fiber. In FIG. 16, the fiber enters the apparatus, and is fixed to the stationary anchor. The fiber then proceeds to the floating support to which it is fixed, then around the dowel which reverses direction while maintaining proper minimum bend radius of the fiber, and again fixed to the floating support and stationary anchor. By displacing the floating support by the disturbance actuator, longitudinal strain is placed in 4 locations of the fiber—that between the anchor, support, and dowel; in both directions.

In another embodiment the longitudinal forces in the fiber at are generated by wrapping the fiber around a body having two parts of the body separated by a slit and moving the two parts toward and away from one another. The cylindrical shell supporting the wrapped fiber is stably mounted at the fixed anchors and can be moved at high frequency with low forces at the actuator at the edge of the slot. In this way the required signal can be applied to the fiber at the required amplitude and frequencies without difficulty and effectively. In this implementation the actuator may be mounted to the free edge of the cylinder at the slit, causing the free edge to move under the influence of the vibrating mass of the actuator. Alternately, the body of the actuator may be fastened to the same support base as the stationary supports and the portion of the actuator that is displaced may be fastened to the free edge, causing vibration without influence of stiffness of the edge, mass of the actuator, or resonances thereof. This vibration stretches and releases tension on the fiber(s), thereby modulating the longitudinal strain.

In accordance with a further feature of the invention which can be used with any of the above features there is provided an apparatus for verifying operation of an optical fiber monitoring system comprising:

an optical fiber system including a fiber to be monitored;

a common housing mounted at an end of the fiber to be monitored;

a monitoring system to detect changes in the optical fiber caused by an event on the fiber comprising:

a source of light arranged to transmit a monitor signal along the fiber;

a transducer arranged to receive the monitor signal after transmission along the fiber;

and a monitoring processor arranged for analyzing the monitor signal after transmission along the fiber to detect changes therein caused by the event to be monitored;

and a test device for periodically checking proper operation of the monitoring system comprising:

a fiber disturbance actuator to cause disturbance of a portion of the fiber at a predetermined location thereon where the disturbance is characteristic of an event to be detected;

and a test processor periodically operating the fiber disturbance actuator and for detecting a response of the monitoring processor caused by changes in the monitor signal caused by said fiber disturbance actuator;

wherein at least the monitoring processor and the test processor are mounted in the common housing.

In one embodiment, the monitoring processor and the test processor can be parts of a common processor or in an alternative embodiment the monitoring processor and the test processor are separate processors where the monitoring processor communicates to the test processor data related to the changes in the monitor signal caused by said fiber disturbance actuator.

In accordance with a further feature of the invention which can be used with any of the above features there is provided a method for operation of an optical fiber monitoring system comprising:

using a detection system to detect changes in an optical fiber caused by one or more events on the fiber by:

transmitting from a source of light at a transmit location a monitor signal along the optical fiber;

receiving the monitor signal after transmission along the fiber;

analyzing the monitor signal after transmission along the fiber to detect changes therein caused by the event to be monitored;

and generating an alarm in response to said detected changes which are indicative of an event;

generating a waveform which is arranged to trigger an alarm;

and periodically optically injecting a test signal corresponding to said waveform into the fiber to test operation of the detection system.

In one embodiment the test signal is injected into an added length of optical fiber which is connected to the fiber to be monitored through a device, such as a coupler, splitter, circulator, whereby the test signal is backscattered into the fiber to be monitored. In a monitor system that detects Rayleigh backscatter, it is necessary to present an appropriate signal for detection. In this embodiment, an additional length of optical fiber is added, and that fiber is excited by a laser, causing Rayleigh backscatter to be launched into the monitored fiber and return to the monitoring system.

In this arrangement preferably the added length of optical fiber is terminated in a low reflectance manner.

In this arrangement preferably the added length of optical fiber is terminated using a wavelength specific reflection, such as a Fiber Bragg Grating, which acts to return just the added test signal.

In one embodiment the test signal is injected from a laser into the fiber at or adjacent a far end of the fiber.

In this arrangement, an amplitude of the test signal can be lowered to correspond to a backscattered signal. For example, the test signal can be reduced in amplitude by in-line attenuators. In this arrangement, angled connectors and low-reflectance optics can be used to control any back reflection from the detection system.

In one embodiment the laser at the transmit section of the monitoring device generating the monitor signal is periodically disabled while continuing to monitor with receiver. This allows the monitor system receiver to detect an injected signal in the absence of a monitor signal. It allows more sophisticated messaging that is not buried in monitor signal.

In one embodiment the transmit signal is sent during off times that are normal to a pulsed laser device. This does a similar effect to the one immediately above with the exception that is ties the timing to the pulses of the monitor system which translates into a distance location. The monitor system sends a pulse and interrogates the reflections coming back as a function of time which equates to distance. Tying an injected signal to that time base shows it at the far end of the fiber.

In one embodiment the test signal is injected from a laser into the fiber at a position spaced from a far end of the fiber and the signal is transmitted along the fiber by reflection from the far end. In this arrangement preferably a low internal reflectance variable attenuator, optical switch, or both are placed inline with a high reflectance termination. Preferably the termination is an unterminated or air-gap connector. For example the fiber is terminated with a reflection such as a reflective deposition on a connector face, such as gold.

In one embodiment the reflection is periodically turned on or off, creating an effective end of line signal that provides many of the features set forth above.

In one embodiment a variable attenuator is modulated such as with a sine wave, causing the end reflection to vary at a pre-determined rate which adds an additional layer of security as the monitoring device will watch for that frequency at that precise location.

In one embodiment, as explained herein, the test signal is a waveform which is representative of one event of said events. For example, the waveform is generated by recording an actual event.

In one preferred arrangement, the monitor signal is analyzed by the DAS system described above which requires very narrow spectrum lasers of tightly controlled wavelength and a laser used to inject the test signal is controlled and arranged to provide a test signal which meets the requirement of the DAS system.

In one preferred arrangement, the analysis system is modified based on the received test signal caused by said injected signal so as to tune the analysis.

DETAILED DESCRIPTION

Figure 1:
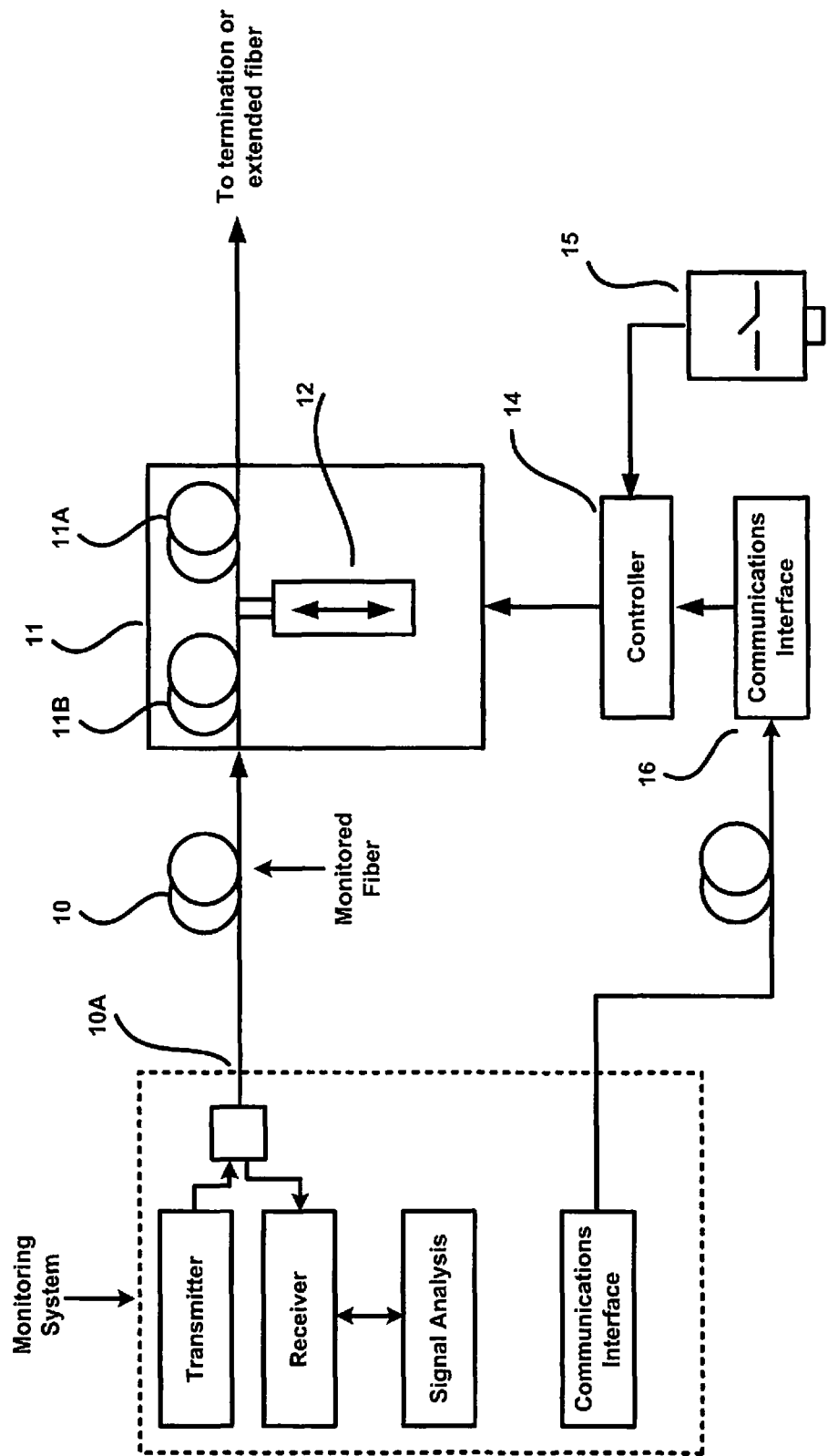
FIG. 1 is a block diagram showing a system of the present invention installed in a fiber to be monitored by inlet and exit isolation fibers.

As shown in FIG. 1 there is provided a fiber 10 including connector 10A which provides an input from a monitoring device such as a fiber optic security system. An isolating fiber portion 11 including inlet and exit portions 11A, 11B is connected into the fiber 10 and acts to displace the main monitored section of the fiber from the monitoring device. A fiber disturbance generator 12 is mounted in the isolating fiber portion and is controlled by a controller 14. This causes an input disturbance of a predetermined signature and magnitude, as discussed hereinafter, on the portion of the fiber 10 which is being monitored by the monitoring device.

The controller 14, which can be actuated by a switch 15 or by a communications interface 16, from the monitoring system acts for causing the fiber disturbance generator to generate the characteristic disturbance signature with the required magnitude of disturbance.

The communications interface acts to allow the monitor system to initiate a test. The mechanical switch can be used by a system operating person for generating an autonomous test In FIG. 3 an installation is provided of the fiber disturbance actuator system including the actuator and the isolation fiber portions at the near end of the fiber is shown. This consists of the system monitor, such as a Distributed Acoustic Sensor interrogator as discussed above. This detects the characteristic disturbance signature introduced by the fiber disturbance generator. As this type of monitoring system is very sensitive to reflections, the isolating fiber isolates the fiber disturbance generator from the reflections caused by the connection to the monitor. Also the isolation fiber portions act to allow recovery from any deadzone effect of the monitor. For example, any monitor utilizing optical time domain reflectometry (OTDR) exhibits a "deadzone" at the front panel, causing it to be blind to events immediately after the connection. The internal isolating fiber eliminates that issue since in effect the dead ne is moved into the isolation fiber area.

The output isolating fiber portion 11B, like the input isolating fiber portion 11A, allows for isolation from the front connector. It also allows the system to be connected bidirectionally. The output of this output fiber portion is connected to the fiber 10 to be protected. The controller section causes the fiber disturbance generator 12 to generate the required signature and amplitude for detection.

The optional external switch 15 can be activated to cause the controller to cause a test to be performed under control of the system operating personnel, that is, without prior instruction from other equipment in the control system.

Figure 2:
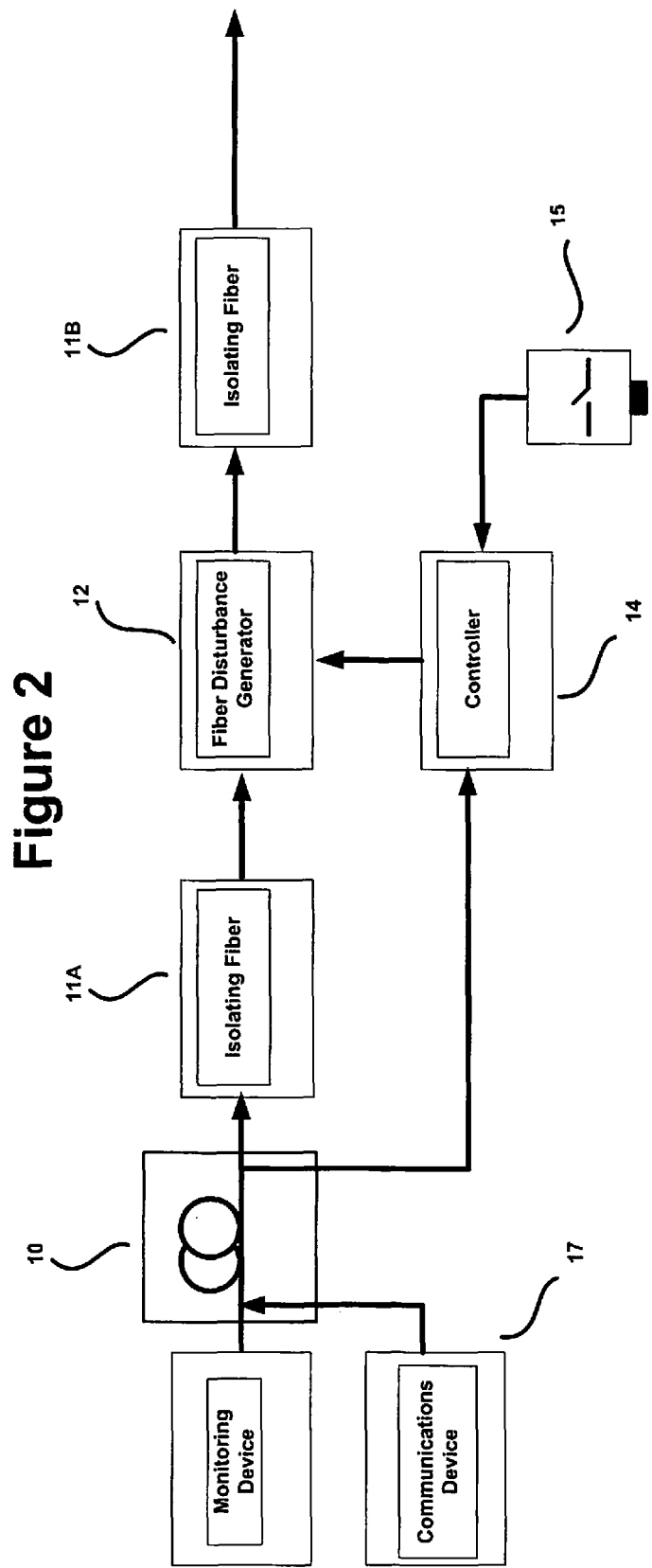
FIG. 2 is a block diagram showing a system of the present invention installed as a far end connection in a data transmission fiber to be monitored using inlet and exit isolation fibers.
Figure 3:
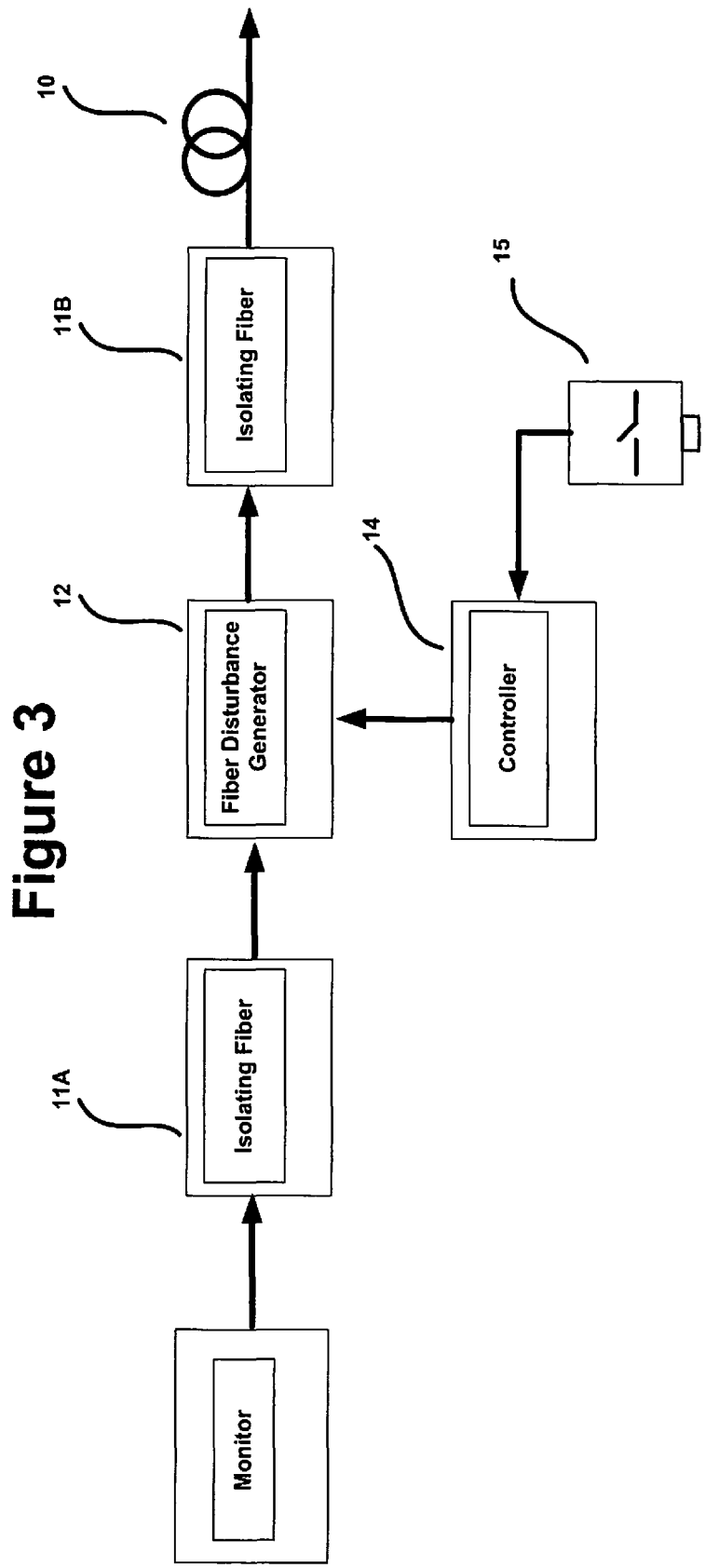
FIG. 3 is a block diagram showing a system of the present invention installed as a near end connection in a data transmission fiber to be monitored using inlet and exit isolation fibers.

FIG. 2 shows a version of the invention which is similar to the FIG. 3 with the differentiation that it is intended to be installed at the far end of the fiber, or at any location remote from the near end where power is available. The addition of a communication device 17 connected to a communication medium such as the shown fiber is used to send instructions such as a request for test to the controller and a feedback from the monitor system concerning the amplitude of the disturbances. This has the added benefit of testing the far end of the cable or at a location remote from the near end, which enhances assurance of security.

Figure 4:
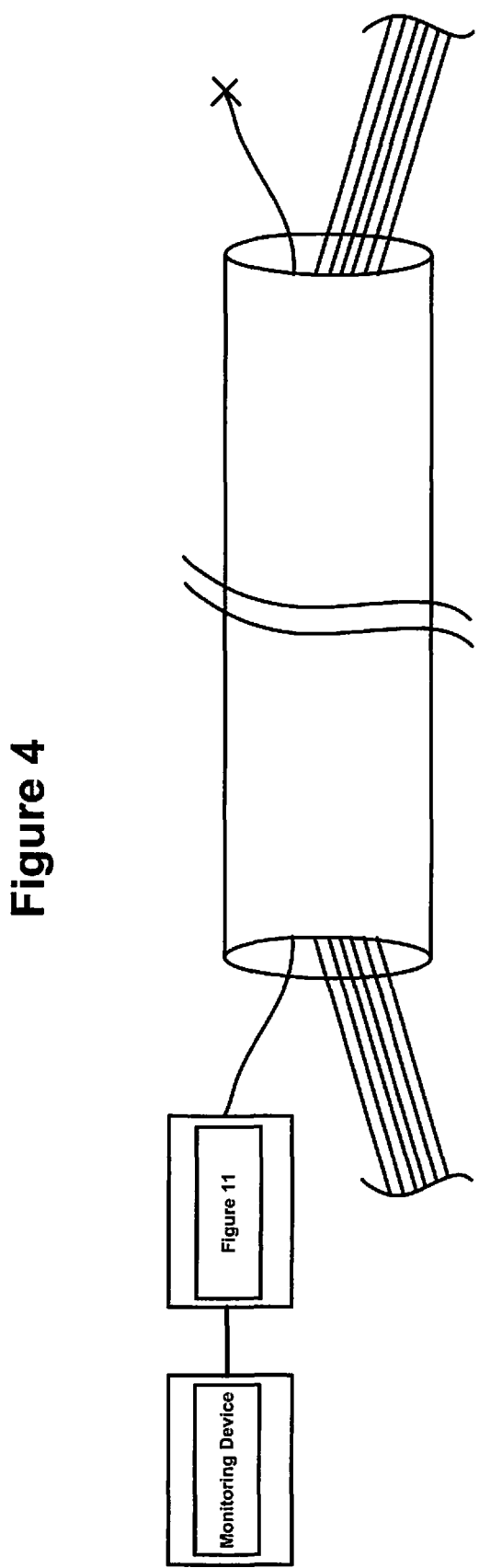
FIG. 4 is a block diagram showing a system of the present invention installed as a near end implementation using a separate dedicated monitoring fiber in a data transmission cable.

FIG. 4 illustrates the monitor fiber which intrinsically protects all the fibers in the cable by utilizing a spare fiber in the cable.

Figure 5:
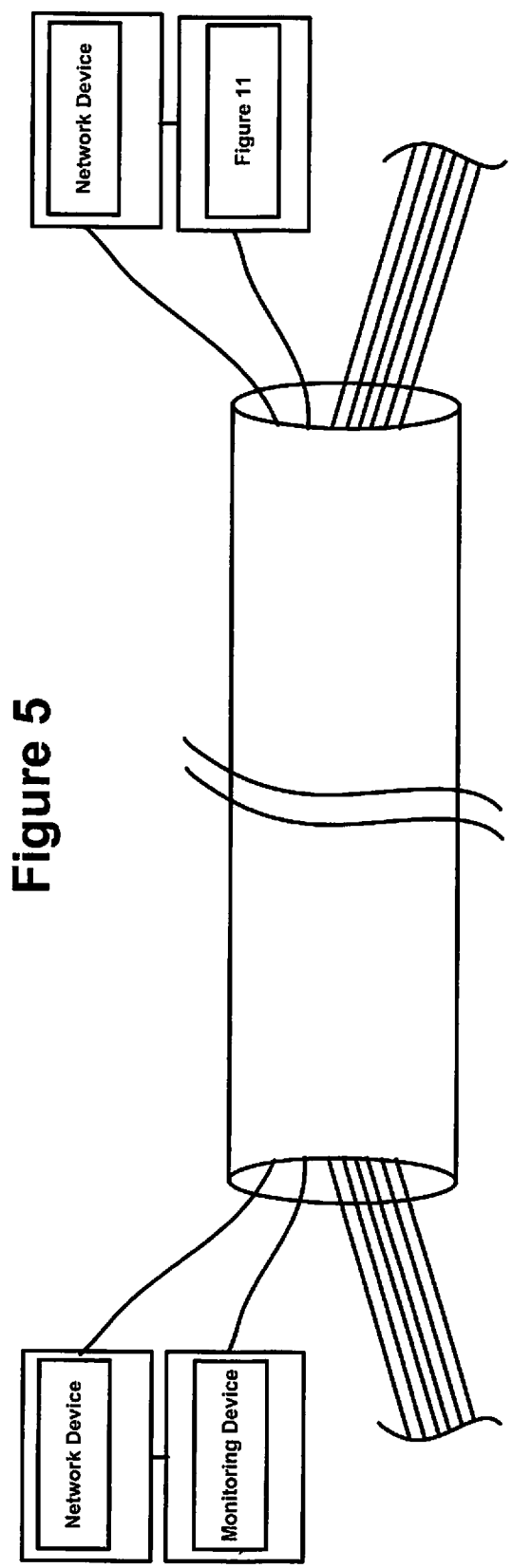
FIG. 5 is a block diagram showing a system of the present invention installed as a far end implementation using a separate dedicated monitoring fiber in a data transmission cable.

FIG. 5 illustrates an embodiment that utilizes a pair of available fibers in a cable: one for monitoring and one for communications between the monitoring device and the near end equipment. This is a preferred embodiment where a system can be installed on spare fibers in a cable adding connectivity assurance as well as health tests and periodic testing to the cable monitor.

Figure 6:
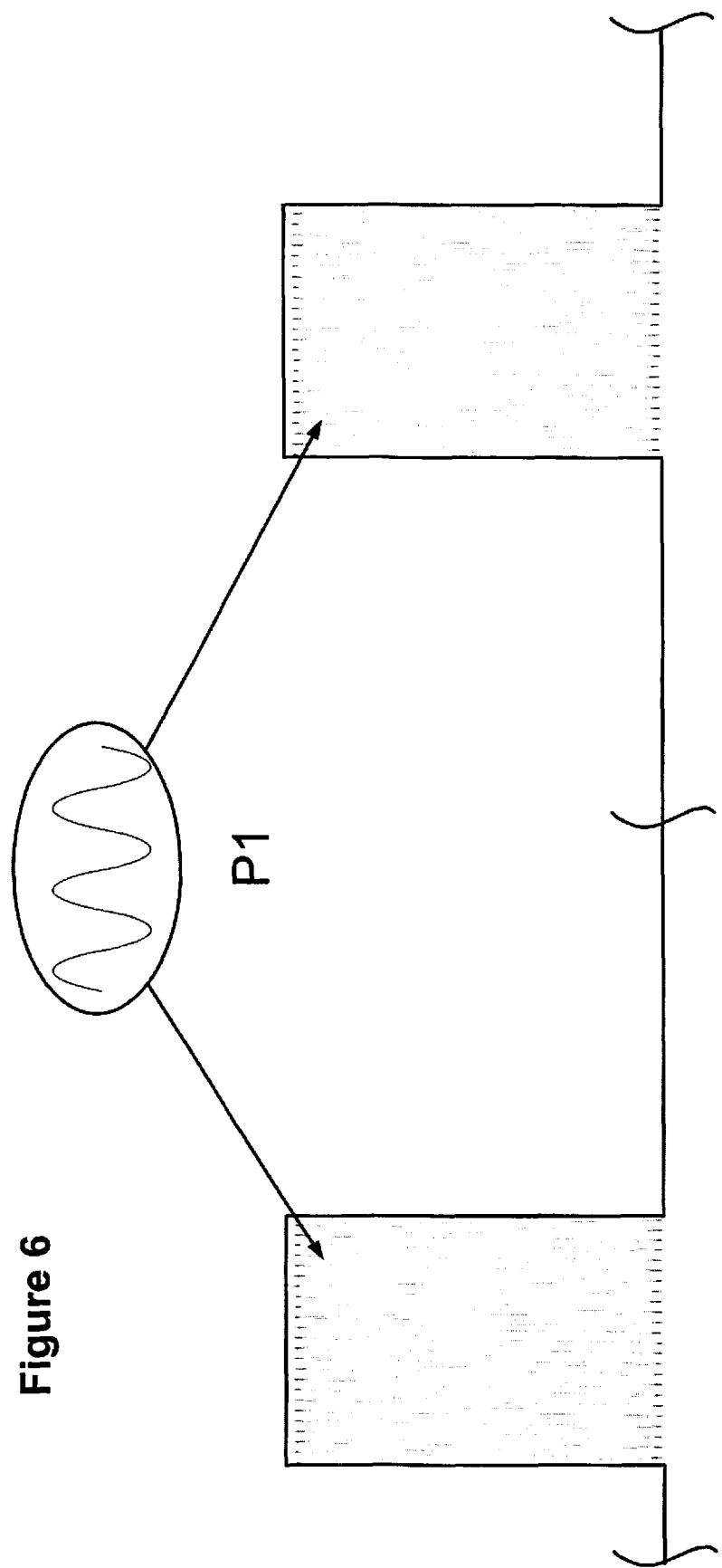
FIGS. 6 and 7 show sample bursts of cyclical disturbances arranged in envelopes which provide a specified signature of period and frequency which allows the monitoring device to identify the applied disturbances from the fiber actuator.
Figure 7:
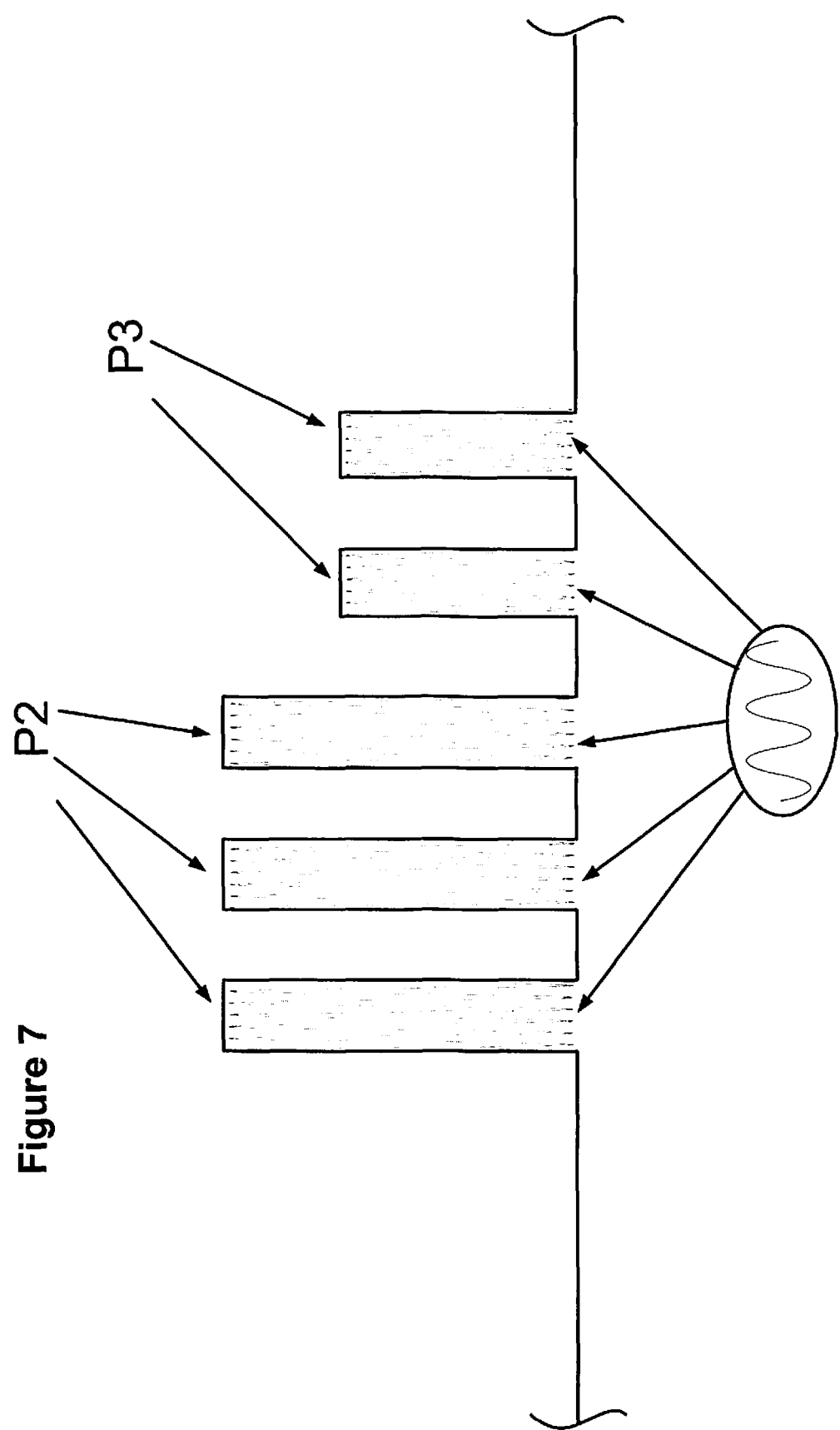

FIGS. 6 and 7 show typical patterns P1, P2 and P3 of fiber displacement where the fiber disturbance actuator generates a series of spaced envelopes of signal bursts each containing predetermined periodic displacements to the fiber. In FIG. 7, the frequency of the bursts in the pattern P2 is increased relative to that of FIG. 6 and the period of the bursts is decreased. It will be appreciated that various patterns can be generated to create a signature pattern to be detected by the monitoring system. Preferably the frequency of the pulses is chosen to be out of band with ambient disturbances. Preferably the modulation frequency provides a duty cycle defining the frequency bursts which is chosen to be dissimilar to natural occurrences which can be expected from machine learning so that the signature pattern can be readily determined during the test process. This can include repetitive duty cycle such as 50:50. The duty cycle defining the frequency bursts may be a complex keyed code for security. This can be changed periodically, randomly, on a scheduled basis, or triggered by a coded or uncoded message or by detectable amplitude changes to the envelope as shown in pattern P3.

In FIG. 7 the last pulses in pattern P3 are shown at reduced amplitude which is determined by analysis of the received monitoring signals so that the amplitude matches a requirement to provide signals which are large enough to be identified and not so large that they interfere with the normal monitoring process by having changes which are beyond those which are expected and are measurable.

When used for near end applications, system can be implemented with only the first isolation fiber, which is provided between the monitoring device and actuator device.

When used for the far end application, system is implemented with both input and output fibers as a method for isolating the actuator signal from reflections.

The system with input and output fiber spools can be used either near end or far end, and is bidirectional in that it can be optically connected in either direction.

It will be appreciated that the type of disturbance used by the system actuator is selected to match the technology of the monitoring device; thus for example:

In a modal metric detection system, the actuator typically uses a disturbance device which acts to bend or physical move a portion of the fiber.

In an attenuation detection system, the actuator typically uses a disturbance device which acts to bend the fiber.

In an Optical Time Domain Reflectometer detection system, the actuator typically uses a disturbance device which acts to bend the fiber.

In a Distributed sensing (DAS/DSS/DTS) detection system, the actuator typically uses a disturbance device which acts to create changes in the monitor signal which can be detected by this type of monitoring system.

In a Distributed Acoustic Sensing (DAS) detection system, the actuator typically uses a disturbance device which acts to move the fiber in a shaking or vibrating action, or by inducing strain such as by stretching the fiber.

In a Strain monitoring system such as strain gauge detection system or a Distributed Strain Sensing system (DSS), the actuator 12 shown in FIG. 1 typically uses a disturbance device which acts to stretch or compress the fiber.

In a Distributed Temperature Sensing (DTS) detection system, the actuator 12 in FIG. 1 typically uses a disturbance device which acts to heat or cool the fiber.

In a Polarization detection system, the actuator typically uses a disturbance device which acts to bend or shake the fiber, or mechanically rotate the state of polarization such as by moving, shaking, or vibrating paddles which introduce birefringence by changing stress on the fiber by way of bending or rotating.

In an Interferometery detection system, the actuator typically uses a disturbance device which acts to bend or shake the fiber.

As an alternative an active area of actuator can contain a fiber Bragg grating, in which the actuator acts to heat, bend, or stretch the grating.

The communications interface may contain a dual wavelength/single fiber ethernet connection. When used with a single fiber monitor, a two fiber solution will protect a cable. When installing optical cables, it is common practice to install cables with more fiber than is needed for the immediate or foreseeable future. As the bulk of the price of an installation is labor, and the price difference when upgrading the fiber count is incremental, unused (called "dark") fiber are often available. As networks most often utilize 2 fibers each, one for transmit and one for receive, and as fiber count in cables is typically an even number, often a multiple of 6 or 12, there are often pairs of optical fibers that are available for use. Single fiber monitoring systems, such as DAS, will utilize one fiber in a pair while leaving the other available for communication. Single fiber communications standards, such as Ethernet, provide full duplex communication over a single fiber by transmitting one wavelength, such as 1310 nm, in one direction, and another wavelength such as 1550 nm in the opposite direction. Combining the single fiber monitoring with the single fiber communication provides a complete instance of this invention on a pair of fibers. Single fiber communications solutions can also be achieved by techniques such as differing modulation frequencies, states of polarizations, time division multiplexing, and others.

Similarly, the communications might be realized by use of multiple fibers, such as two. Monitoring and communications functions can be performed over the same fiber pair(s) by use of wavelength division multiplexing, time division multiplexing, or other multiplexing schemes.

Zone based non-locating monitoring methods are often implemented over two fibers, or a fiber loop. Use of multiplexing methods such as wavelength division multiplexing, time division multiplexing, or other multiplexing schemes can be utilized to share the fibers between the monitoring and the communication systems.

CW detecting monitoring devices, such as zone type network or perimeter protection devices can detect the frequency with a frequency detecting method.

This method can be a hardware phase locked loop within the receiver circuitry of the monitoring equipment. In this embodiment, a disturbance of known frequency is generated while frequency detection equipment such as a phase locked loop is used for detection, which registers a successful test.

This method can be a software phase locked loop. Similar to the hardware phase locked loop within the receiver circuitry of the monitoring equipment, a detection algorithm is used within the signal processing software. In this embodiment, a disturbance of known frequency is generated while frequency detection algorithm emulating a phase locked loop is used for detection, which registers a successful test.

This method can be bandpass filters. Similar to the hardware phase locked loop within the receiver circuitry of the monitoring equipment, a hardware or software frequency filter can suppress all frequencies except that of the disturbance generator. In this embodiment, a disturbance of known frequency is generated while detection equipment detects the signal passed through the bandpass filter, which registers a successful test.

This method can be Fourier Transforms. The spectra of a received signal can be inspected for the presence of the disturbance frequency. In this embodiment, a disturbance of known frequency is generated while detection equipment detects the signal as a spectral spike of sufficient amplitude, which registers a successful test.

This method can be correlation, including Wavelet Transforms. The spectra of a received signal can be inspected for the presence of the disturbance frequency. In this embodiment, a disturbance consisting of a pulse, chirp, wavelet, or other finite signal of known composition is generated while detection equipment detects the signal and applies correlation or Wavelet Transform to detect the presence of the disturbance, which registers a successful test.

Zone based products may multiplex communication signal and monitor signal on the same fiber pair by using wavelength division multiplexers. Zone based systems may be configured for single mode or multimode fiber.

A system as described, but used for zone-based non-location determining systems, can omit the internal isolations fiber portions as reflections and dead zones are not of concern.

For vibration sensing monitoring sensors, the active device disturbing the fiber within the disturbance generator may be of several technologies, including but not limited to:

Electromagnetic actuators which cause displacement by energizing a coil or other electromagnetic device. This might include attaching a fiber to a moving portion of a voice coil As Electromagnetic actuators which cause displacement by coating by depositing or other technique a sensitive material to the fiber and placing it within the field with no other moving parts.

The fiber disturbance device 12 shown in FIG. 1 can use a Piezo-electric actuator attached to the fiber and causing the vibration The fiber disturbance device 12 shown in FIG. 1 can use a Haptic actuator such as the rotating motor type Mechanical such as rotating cam or sawtooth The fiber disturbance device 12 shown in FIG. 1 can use an arrangement where the fiber is displaced by placing it between stators within an electrostatic field, and varying the field to displace the fiber Variable optical attenuator: perturbation is a variation in optical signal amplitude Variable polarization controller: perturbation is variation in optical signal polarization Variable optical mode mixing: use a mode mixer to change modal fill of optical signal in MMF fiber, causing a perceived perturbation in our products In the described system, a fiber Bragg grating may be used within the disturbance generator. When perturbed, detectable wavelength shifts are detected.

In systems that determine distance or location, the detection signature should occur at a predetermined location, representative of the installation. This precise location thwarts attempts to spoof the system by bypassing with a separate fiber. This attempted spoofing might, at the fiber patch panel or other convenient locations, replace the connections to the monitored cable with a fiber. Requiring a precise fiber length and event location significantly eliminates that ability.

The disturbance repetition rate, frequency, or combination of these and other parameters may be arranged to be representative of a unique key.

The system may be placed at the beginning, end, or any location along the path of the fiber where electrical power is available.

The device is preferably arranged to produce a heartbeat at a configurable, identifiable frequency and cadence that the monitoring interrogator can reliably interpret as a unique event.

When operating in periodic mode the device can be configured with a cryptographic key to communicate time based one-time passwords (TOTP) during tests. This can be used to prove the identity of the test device to the sensing device. The password can be encoded by the content of the test signal. The password can be encoded by the timing of the test. In this way, devices operating in the above time based one-time password mode can be used not just for testing the sensing system, but for providing evidence that sensing cable has not been bypassed. Devices operating in periodic mode only without network access may be battery powered.

The disturbance Generator will have an adjustable magnitude which will allow perturbation to be adjusted to be appropriate to the magnitude of the monitor signal. The amplitude must be high enough to be detected, but not so high as to interfere with signal processing. This may be controlled from any of several locations, including over a network from the monitor end of the fiber, or controlled locally such as a local network, manual adjustment, or serial connection.

Figure 8:
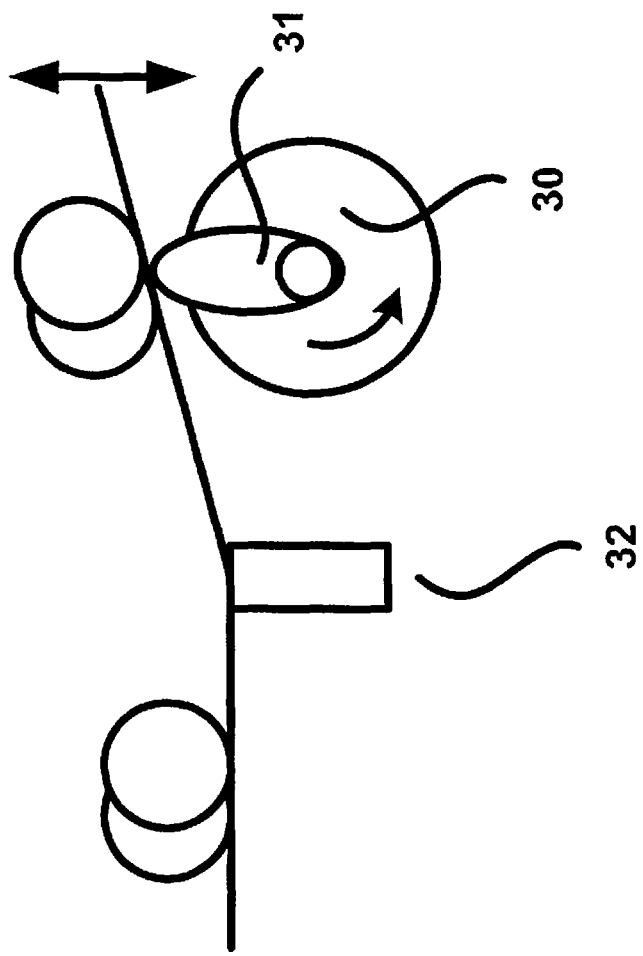
FIG. 8 shows schematically one example of a fiber disturbance actuator using a motor for physically moving one part of the fiber relative to another.

FIG. 8 shows schematically one example of a fiber disturbance actuator using a motor 30 operating a rotating cam 31 for moving one part of the fiber relative to another part which is held fixed by an anchor 32.

Figure 9B:
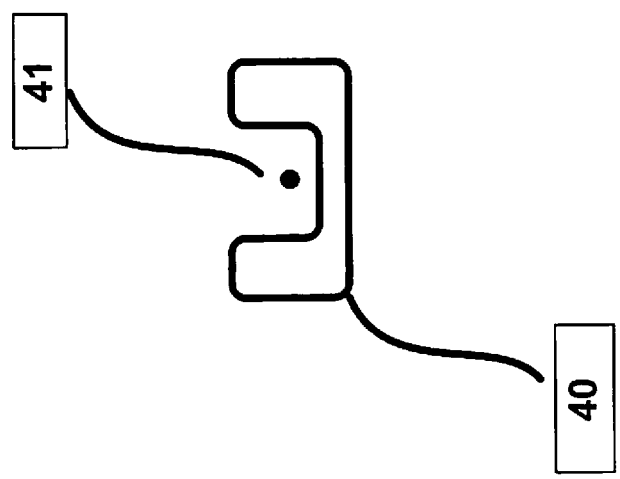
FIGS. 9A and 9B show schematically in side and end view respectively one example of a fiber disturbance actuator using an electromagnetic field to physically move a fiber portion which is coated with a material responsive to the field.
Figure 9A:
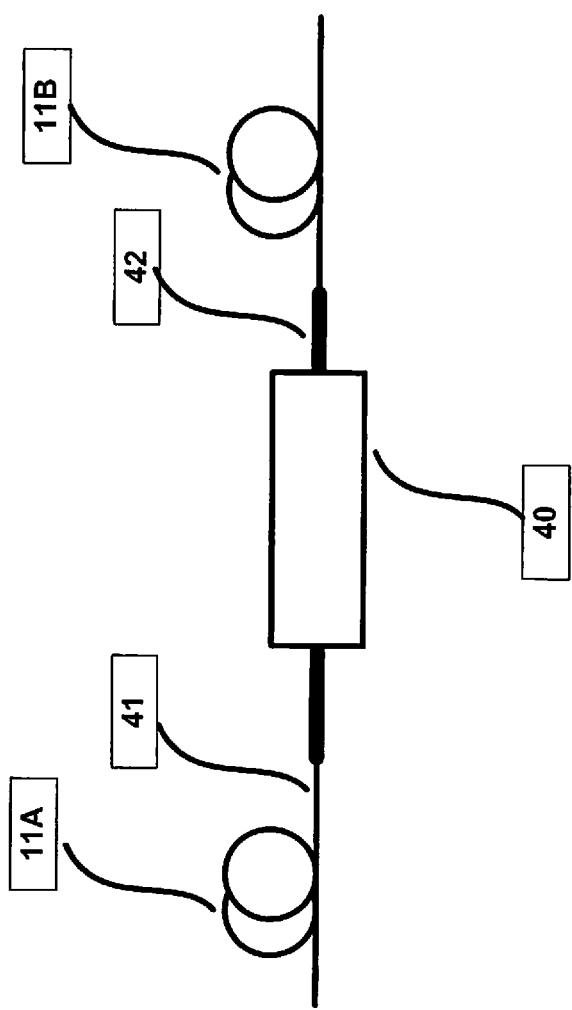

FIGS. 9A and 9B show schematically one example of a fiber disturbance actuator using an electromagnetic field generator 40 to physically move a fiber portion 41 which is coated with a material 42 responsive to the field.

Figure 10:
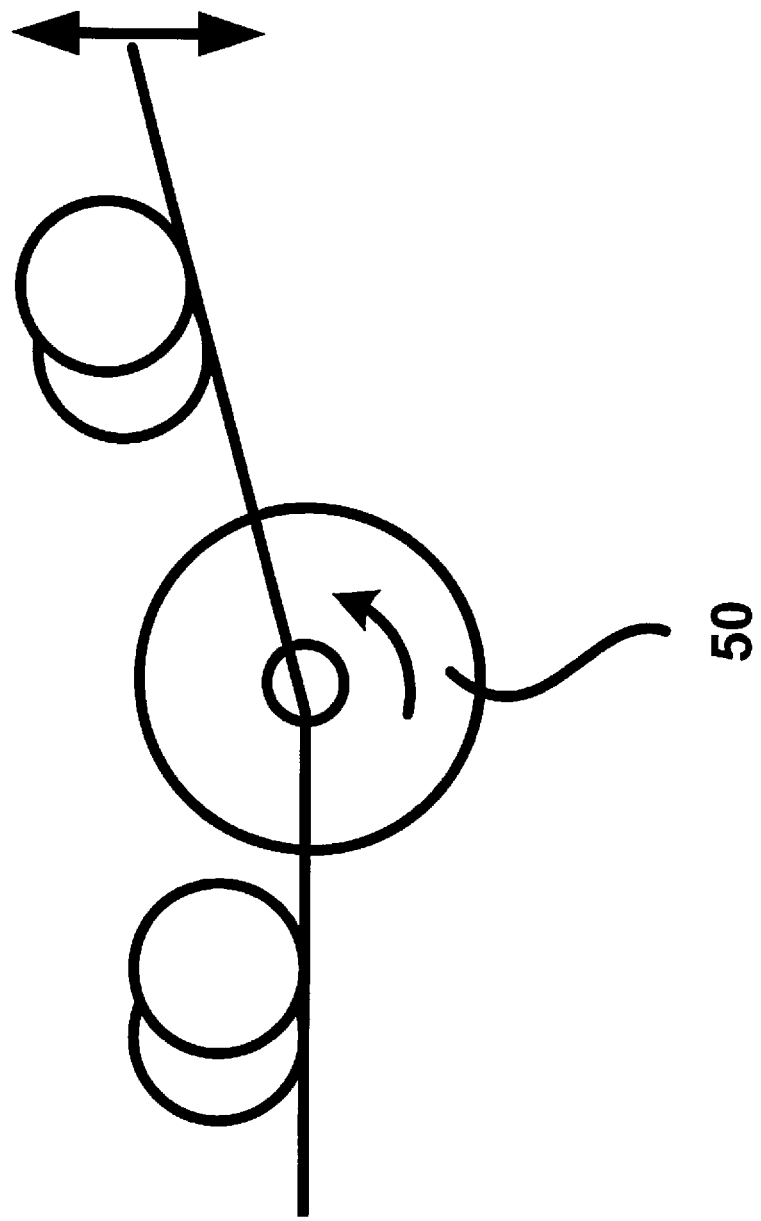
FIG. 10 shows schematically one example of a fiber disturbance actuator which uses a motor to bend one portion of the fiber relative to another.

FIG. 10 shows schematically one example of a fiber disturbance actuator which uses a motor 50 to bend one portion of the fiber relative to another.

Figure 11:
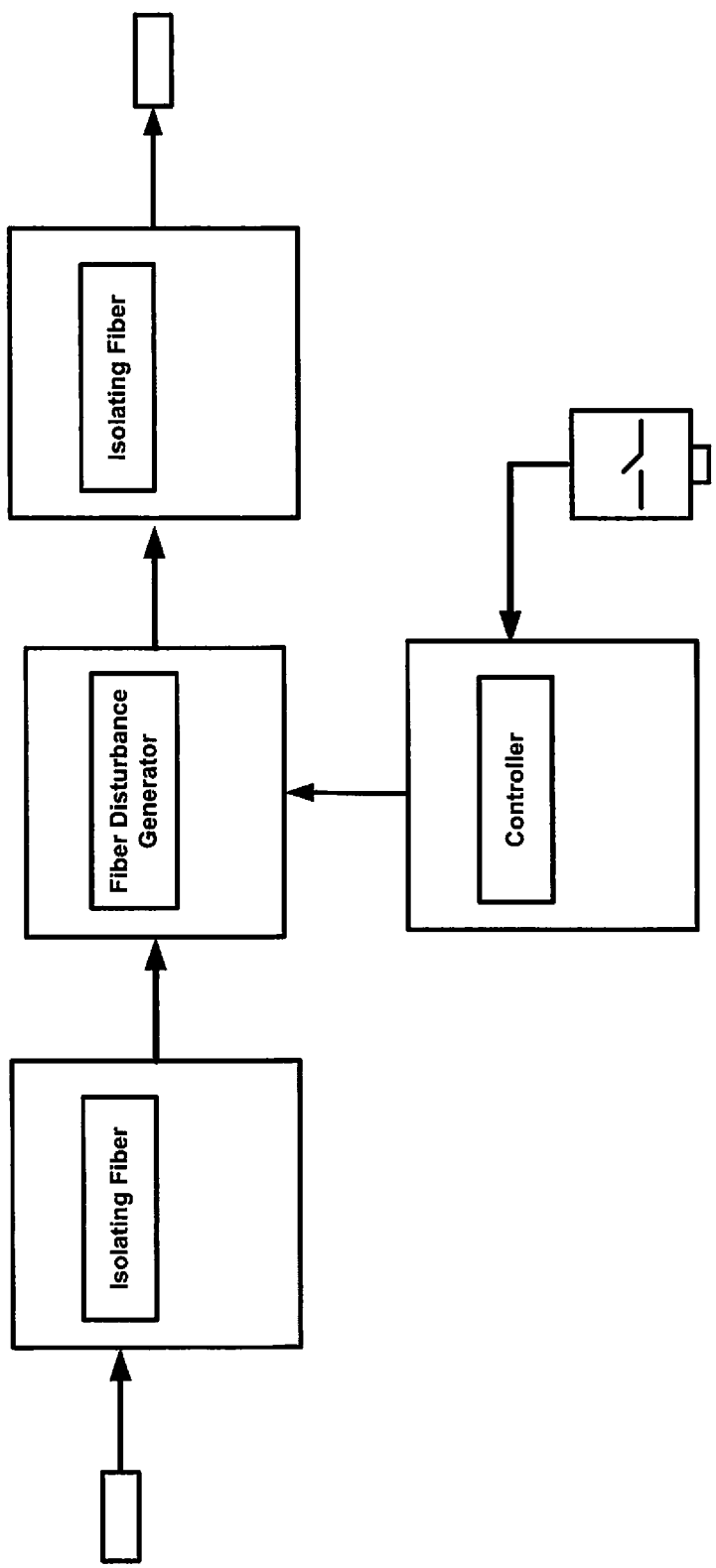
FIG. 11 is a schematic illustration of the operating components which form the elements of the invention for attachment to the fiber to be monitored.

FIG. 11 shows schematically the components herein. Switch 18 represents a mechanical input device which, when actuated, initiates a test or a sequence that leads to the performance of a test. This can also represent other types of interfaces such as contact closures and/or other interfaces to allow the test device to send notifications when certain activities happen in and around the device; i.e. door closures or equipment cabinet openings. Signatures generated by the test device can communicate notifications of inputs at the test device, and report to the monitoring device.

As set forth above, various disturbance mechanisms are disclosed for causing a test to be performed using various arrangement for disturbance of the fiber.

Figure 12:
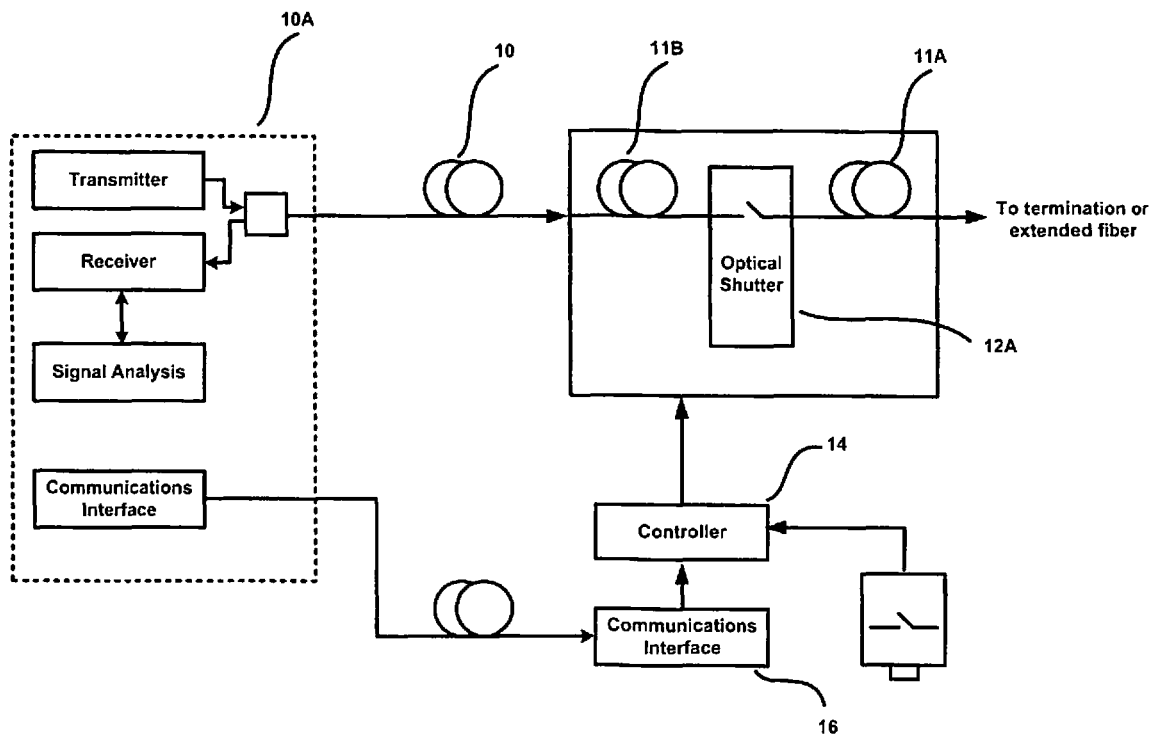
FIG. 12 is a schematic illustration of the operating components which form the elements of the invention for attachment to the fiber to be monitored where the signal in the fiber is disturbed by an optical shutter at the far end of the fiber.

FIG. 1 describes a first embodiment which uses an actuator 12 for disturbing the fiber by mechanical movement. In FIG. 12 is shown an alternative arrangement using many of the same components of FIG. 1 where there is disclosed the concept where the disturbance is carried out by an an optical shutter or switch 12A which is actuated to break the path in the fiber. This provides compliance to Federal regulations for self-test, but rather than perform them directly after the monitor device, the test is performed at the far end of the fiber, certifying that the fiber being monitored is what is expected.

As set forth above, the shutter 12A is operated to provide a disturbance of the fiber in a recognizable pattern to assure that the expected fiber is being monitored.

The method of testing therefore includes the steps of periodically checking proper operation of the optical fiber monitoring system by providing the optical shutter 12A at the second end of the fiber remote from the monitoring system 10A, periodically operating the optical shutter by the controller 14 under operation from the communication system 16 to temporarily terminate transmission of light along the fiber 10 and analyzing the monitor signal at the monitoring system 10A to detect a termination in the monitor signal caused by the operation of the optical shutter 12A.

Figure 13:
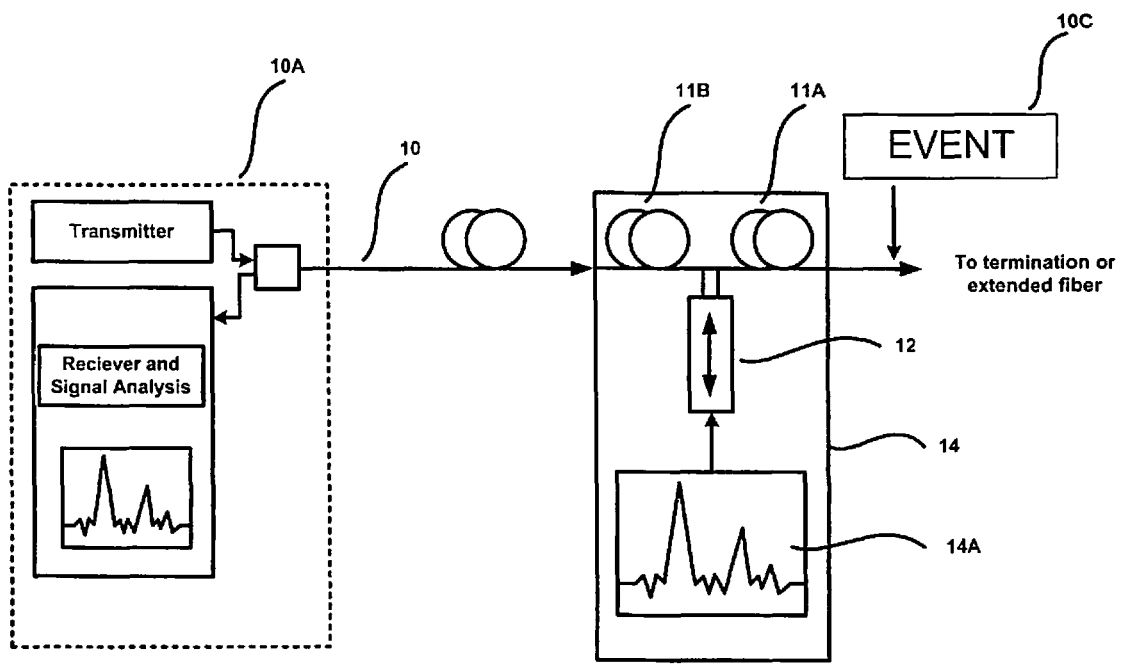
FIG. 13 is a schematic illustration of the operating components which form the elements of the invention for attachment to the fiber to be monitored where the signal in the fiber is generated as a waveform related to or corresponding to a waveform detected from an actual event.

Turning now to FIG. 13 there is shown a further modification where the testing system is improved by storing complex waveforms and recordings 14A in the controller 14 of the test device. These waveforms are representative of an event such as expected intrusions such as a fence climb or fence cut. That is in this method a simulation of an actual event is carried out at event 10C at a location along the fiber where events are expected to occur and the effect of that simulated event is detected by the signal analysis components of the monitoring system 10A so as to generate a waveform. Different events can be simulated at different locations to create a library of waveforms each representative of a respective event. Rather than recordings actual events, waveforms can be generated by modelling or simulation to create the library. Or the library can contain actual events and simulated events so as to be able to carry out a series of tests on the system.

Thus, this system includes the steps of generating a waveform 14A which is representative of one event of the library of events, at a predetermined location on the fiber periodically operating the actuator 12 to cause a disturbance on the fiber which changes the monitor signal in the fiber; where the actuator 12 is operated by the control system 14 based on the waveform 14A.

This is valuable for at least 2 reasons:

The test device playing the recording simplifies a portion of the tuning during the initial installation. A library of intrusions or signals is played while the installation personnel adjusted the monitoring device without the need for a second person performing the intrusions. This allows for smaller work crews for the calibration process.

The test device can play back a recording of an intrusion as part of the routine testing of the monitoring system. Rather than just verify the fiber is being monitored, this allows periodic verification that the monitoring system is performing correctly by detecting representative intrusions. These are not reported as actual intrusions at the monitoring system 10A as the location and timing of the test signal is known to the test device. This functionality adds a layer of protection in that, it not only assures the proper fiber is being monitored, it also assures that they detection calibration has not been altered or desensitized since the set up calibration.

Figure 14:
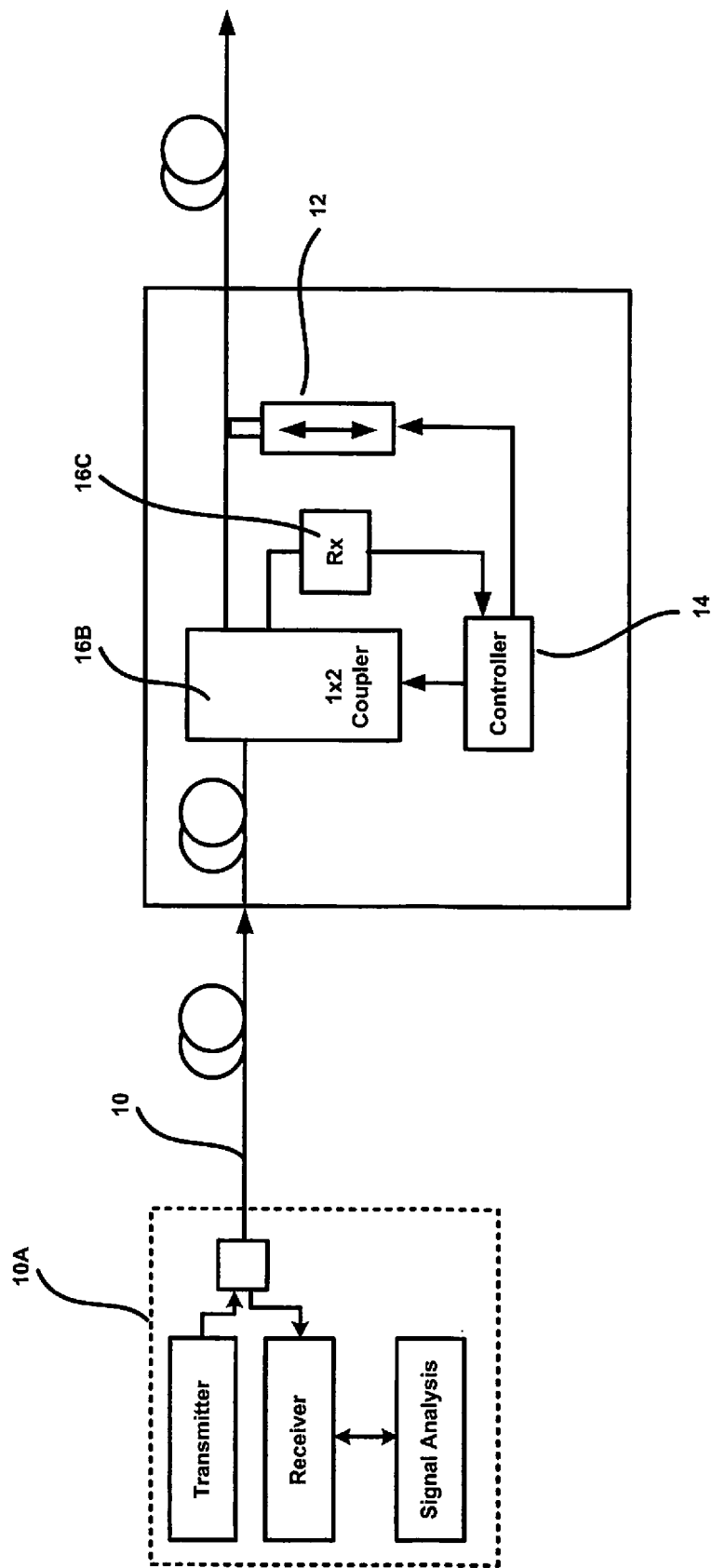
FIG. 14 is a schematic illustration of the operating components which form the elements of the invention for attachment to the fiber to be monitored where the actuator which applies the test signal to the fiber is controlled by a communication system along the same fiber which uses a coupler to extract the control signal.

Turning now to FIG. 14 there is shown an arrangement in which the communication to the controller 14 of the actuator 12 is provided by adding a coupler 16B or other device within or attached to the test device. In this way a portion of the signal fed to an optical detector 16C allows the near end monitoring system 10A to send commands encoded in the test laser pulses through the same fiber 10. This eliminates the need for additional network connectivity to the far end which uses a second fiber as shown in FIG. 1. Thus, in this arrangement an instruction signal is communicated along the same fiber 10 to the actuator 12 to effect the operating of the actuator and there is provided a coupler 16B on the fiber to extract the instruction signal by the detector 16C from other signals in the fiber to communicate with the actuator 12 through the controller 14.

Figure 15:
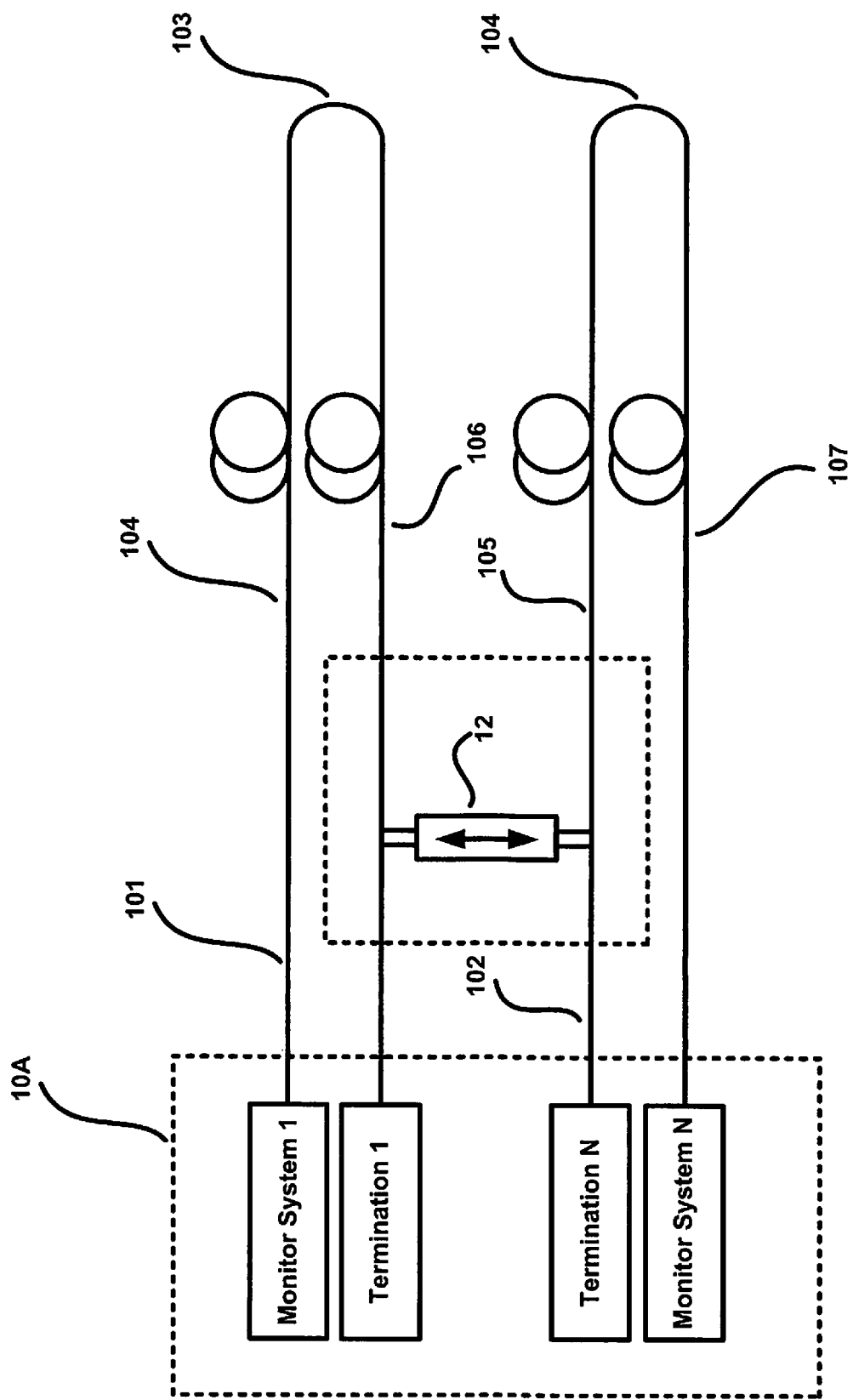
FIG. 15 is a schematic illustration of the operating components which form the elements of the invention for attachment to the fiber to be monitored where the fiber optic system includes two fibers and the method includes transmitting from at least one source of light at the transmit location into the first and second ends of each of the first and second fibers monitor signals so as to travel along the optical fiber.

Turning now to FIG. 15 is shown a pair of monitored fibers, each with a monitor system and with a termination in the same location. In a single fiber locating system, it is common practice to monitor two fibers, often within the same cable, with 2 channels of equipment, and the signals propagating in opposing directions: one traverses the cable clockwise, the other counter-clockwise. This is done for cut protection, if the cable is cut or damaged, one channel monitors CW up to the break, the other channel CCW to the break.

This performs a full fiber monitoring scenario even in the instance of a fully severed fiber cable. In the implementation shown above, monitoring the end of the return cable performs the monitoring function on both cables as though it were a far end implementation. Furthermore, using a single test device eliminates some cost by two disturbance actuators disturbing both fibers together, or separate actuators for independent control. Other circuit components can also be shared including the power supply, controller, etc.

A secondary implementation of FIG. 15 shows a 2-fiber looped back monitoring system. Rather than open the optical test circuit at the near end, this acts to break the connection at the far end, assuring the correct fiber is being monitored. This holds true for closed loop systems which are non-locating in regard to the location of the event as well as systems which act to locate the event along the fiber.

Thus, the system includes a first fiber 101 and a second fiber 102 where each of the first and second fibers extends from the transmit location at the monitoring system 10A to a remote location 103, 104 and returning along a continuous optical path to the transmit location. Each of the first and second fibers defines first and second ends at the transmit location 10A thus defining outward 104, 105 and return portions 106, 106 of the fiber. In this case the actuator 12 is located at the termination end of the fibers and arranged to operate on both fibers. The actuator can act on one leg or both legs of the fibers.

Adding the disturbance actuator 12 at the termination end of the multiple fiber loops allows functionality as follows:

Additional implementation of the single disturbance actuator design is the ability to simplify the test device design by the use of multistrand fiber, such as ribbon finer or bifilar fiber, with the multiple fibers passing through the actuator. The entire test device is the same except for the number of connectors and the internal multi-strand fiber.

For near end implementations, the monitoring device and the test device could be built into the same mechanical chassis.

Additionally, in two-fiber closed loop monitoring systems, this can perform the routine test as required by some federal guidelines for assurance of the fiber monitoring system. By either shared actuators or just shared control electronics, a single rack space device could monitor multiple channels, for example matching an industry standard 4-channel monitoring device.

Figure 16:
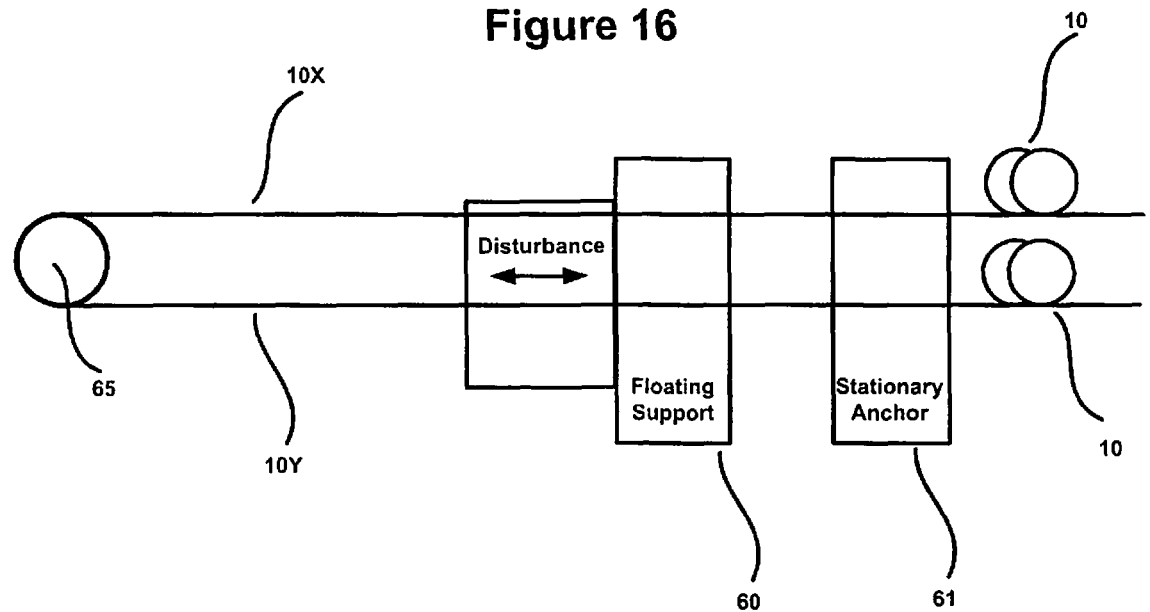
FIG. 16 is a schematic illustration of the operating components which form the elements of the invention for attachment to the fiber to be monitored where the fiber is disturbed by a first arrangement for applying longitudinal forces on the fiber.
Figure 17:
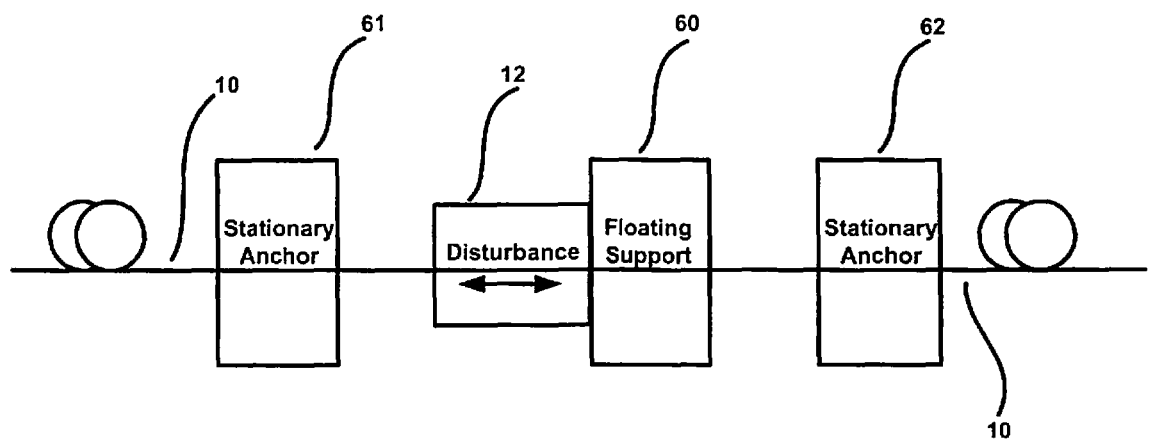
FIG. 17 is a schematic illustration of the operating components which form the elements of the invention for attachment to the fiber to be monitored where the fiber is disturbed by a second arrangement for applying longitudinal forces on the fiber.

Turning now to FIGS. 16 to 19 there are shown arrangements in which an actuator for periodically generating disturbances in the fiber includes components generating longitudinal forces in the fiber at one location along the length relative to another location along the length so as to cause changes in length of the fiber between the first and second locations. That is, as shown in FIG. 17, the disturbances are generated by a longitudinally moving anchor 60 located between two stationary anchors 61 and 62. In this arrangement an electromagnetic actuator 12 provides movement of the anchor 60 longitudinally of the fiber so that the portions of the fiber between the stationary anchors and the floating support are stretched and released alternately to generate longitudinal strain in the fiber. This has been found to generate the necessary changes in fiber structure to introduce the signals.

In FIG. 16 the disturbances are generated by wrapping the fiber around a cylindrical support body 65 to form two adjacent lengths 10X and 10Y and commonly generating the longitudinal forces in the adjacent lengths. That is the support comprises a stationary wrapped anchor 65 around which the fiber is wrapped and there is provided a longitudinally moving anchor 60 movable towards and away from the wrapped anchor as well as from stationary anchor 61.

Figure 18:
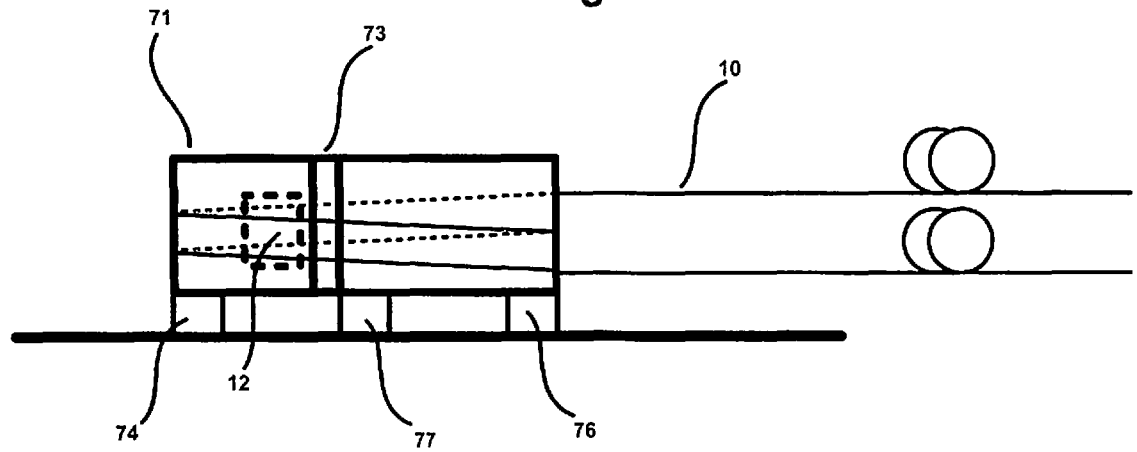
FIG. 18 is a side elevational view of the operating components which form the elements of the invention for attachment to the fiber to be monitored where the fiber is disturbed by a third arrangement for applying longitudinal forces on the fiber.
Figure 19:
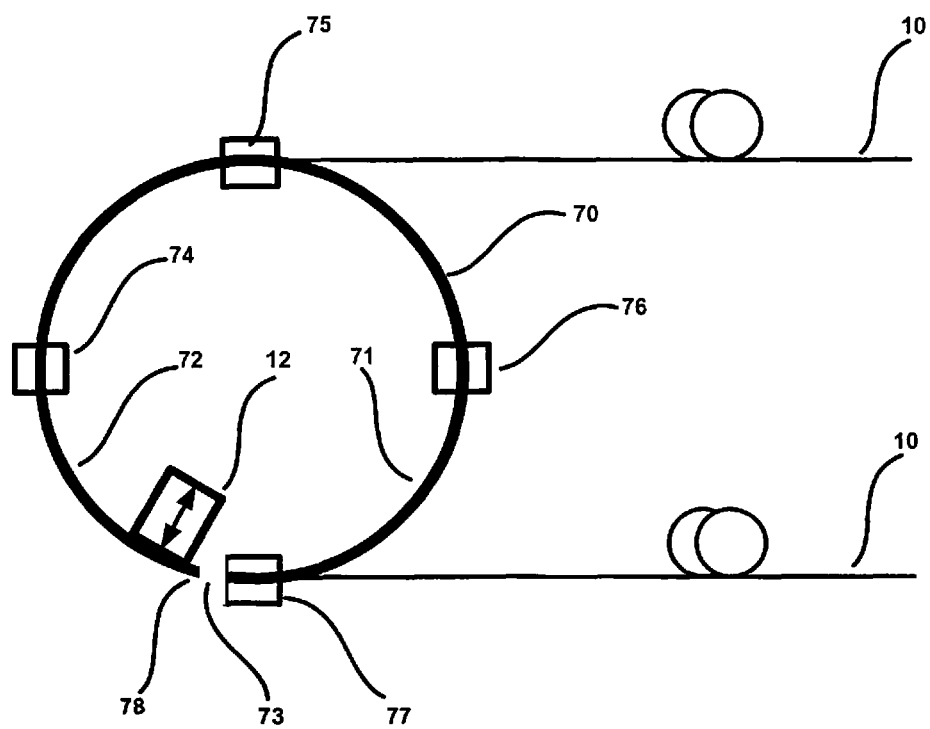
FIG. 19 is a top plan view of the arrangement of FIG. 18.

In FIGS. 18 and 19 is shown another arrangement for stretching the fiber where the longitudinal forces in the fiber are generated by wrapping the fiber around a cylindrical shell 70 having two parts 71 and 72 of the body separated by a slit 73 and moving the two parts relative to one another. Thus, the shell 70 is held fixed at anchors 74, 75, 76 and 77 and a free edge of the shell is moved radially inwardly and outwardly by an actuator 12. This causes the free edge 78 of the shell to move relative to the anchor 77 to cause stretching of the portions of the fiber bridging the slot 73.

The cylindrical shell supporting the wrapped fiber is stably mounted at the fixed anchors and can be moved at high frequency with low forces at the actuator at the edge of the slot. In this way the required signal can be applied to the fiber at the required amplitude and frequencies without difficulty and effectively. In this implementation the actuator may be mounted only to the free edge 78 of the cylinder at the slit, causing the free edge to move under the influence of the vibrating mass of the actuator 12.

Alternately, the body of the actuator 12 may be fastened to a support base connecting the stationary supports for example adjacent the support 77 and the portion of the actuator that is displaced is fastened to the free edge 78, causing vibration without influence of stiffness of the edge, mass of the actuator, or resonances thereof. This vibration stretches and releases tension on the fiber(s), thereby modulating the longitudinal strain.

Turning now to FIGS. 20 to 23 and 25 there is shown a different way to introduce a signal that performs the test function without using mechanical actuators which physically disturb the fiber. This signal used can be any of those described above including envelopes of sine waves as well as complex waveforms.

The concept is to introduce into the far end of the fiber a signal that is representative of either a test tone or signal or a signal representative of a nefarious event directly as an optical signal. There are several ways to accomplish this.

The system uses as the monitoring system 10A, for functionality of the locating vibration sensor, the arrangement described above as the Distributed Acoustic Sensor (DAS), which acts to measure variations in Rayleigh backscattered signal caused by the event to be detected. That is the receiver 10B in the monitoring system 10A is arranged to detect the signals caused by the Rayleigh backscattering which can be analyzed by the signal analysis system 10D to determine the nature of the reflections and whether they are representative of an event to be monitored and also the timing of the reflections to determine the time of transmission relative to the original pulse and hence the location of the event which caused the reflection.

This backscatter is typically 5 orders of magnitude lower than the incident optical power, which requires any externally introduced signal to be of similar magnitude. Additionally, the DAS system is sensitive to reflection such as those caused by poorly mated, faulty, or missing connectors.

When introducing a test signal therefore from a test signal source, typically a source laser, a low reflection must be presented to the monitoring equipment. As DAS systems utilize for the monitor signal source very narrow spectrum lasers of tightly controlled wavelength, great care must be taken to select and control the test signal source laser.

Figure 20:
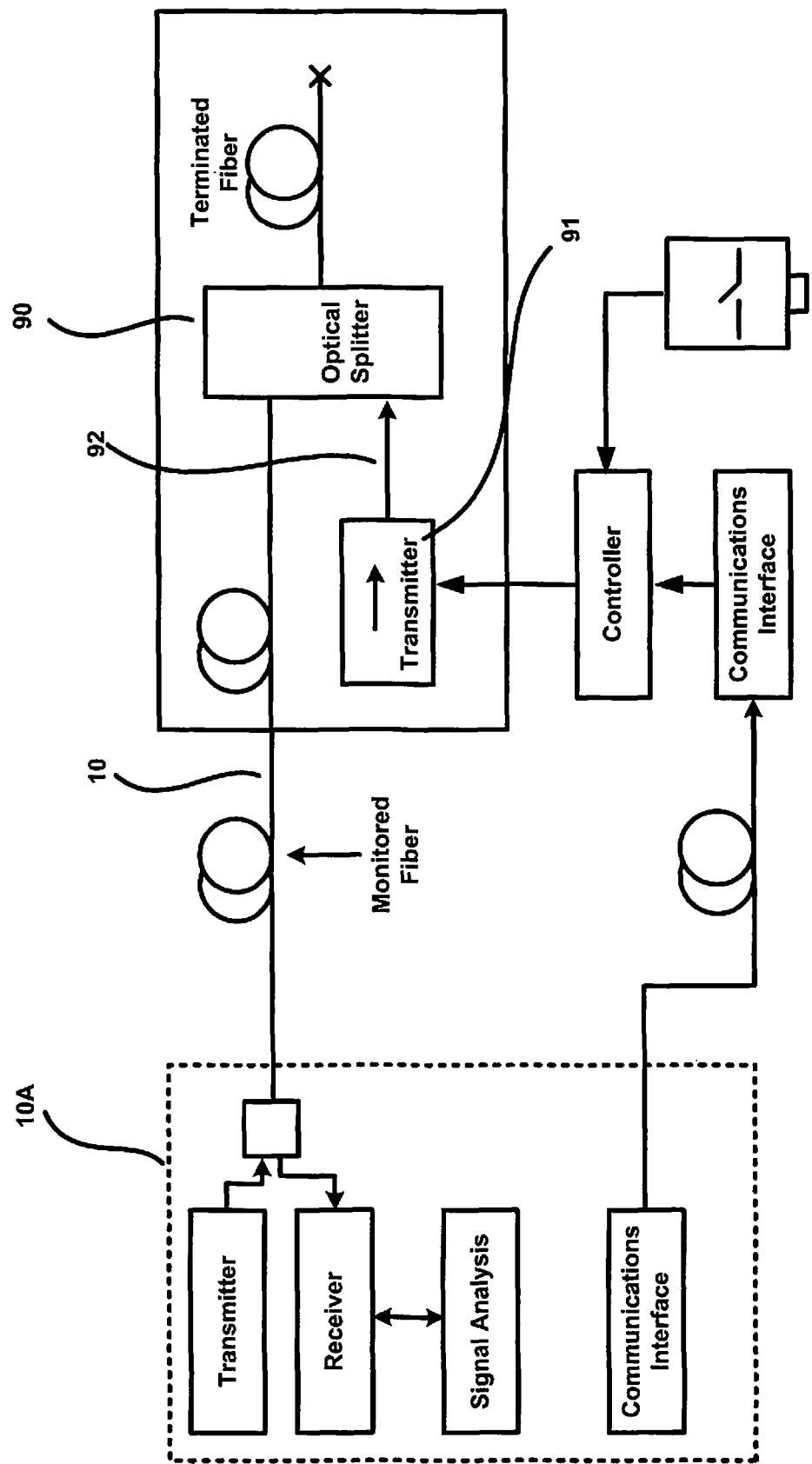
FIG. 20 is a schematic illustration of the operating components which form the elements of the invention for attachment to the fiber to be monitored where the signal in the fiber is applied by optically injecting the signal into the fiber using a first arrangement where the signal is injected using an optical coupler.

As shown in FIG. 20 in a first method there is a shown a secondary backscatter method. Rather than injecting a signal directly into the monitored fiber, an optical transmitter source 91 injects the test signal into a length 92 of optical fiber which is connected to the fiber to be monitored through a coupler 90 which can also be a splitter, circulator, or other such device. The test signal passes through the coupler 90, is launched into the terminated fiber, and is then backscattered into the fiber 10. The added fiber can be properly terminated in a low reflectance manner.

Figure 21:
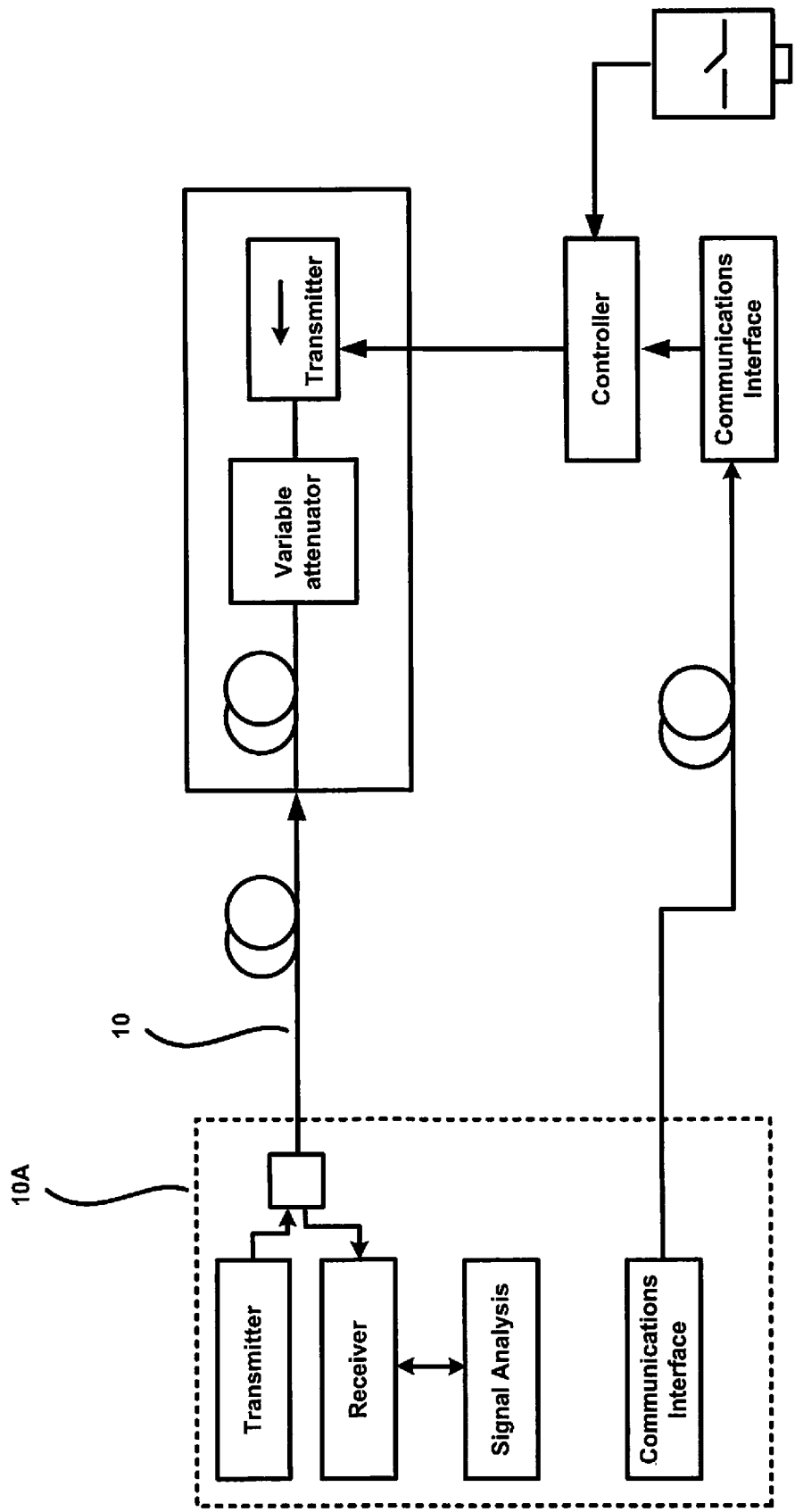
FIG. 21 is a schematic illustration of the operating components which form the elements of the invention for attachment to the fiber to be monitored where the signal in the fiber is applied by optically injecting the signal into the fiber using a second arrangement where the signal is directly injected and inline attenuation components are used to control an amplitude of the required signal.

As shown in FIG. 21 in a second method there is a provided a direct injection of a test signal from a laser 94 into far end 95 of the fiber 10. Angled connectors and low-reflectance optics are used to control any back reflection back into the monitoring device.

As this DAS system measures Rayleigh backscattering, whose signal amplitude is roughly 5 orders of magnitude below incident power, it is important to not reflect signals back to the monitoring system. Any device that is put at the far end must be as non-reflective as possible. In a normal installation, and at the far end of an installation of the device as described above, the fiber is terminated for a very low reflection. A high reflection disturbs the detection system within the monitor.

Additionally, the amplitude should be lowered to correspond to a backscattered signal. This can be achieved by introduction of in-line attenuators 96.

Figure 22:
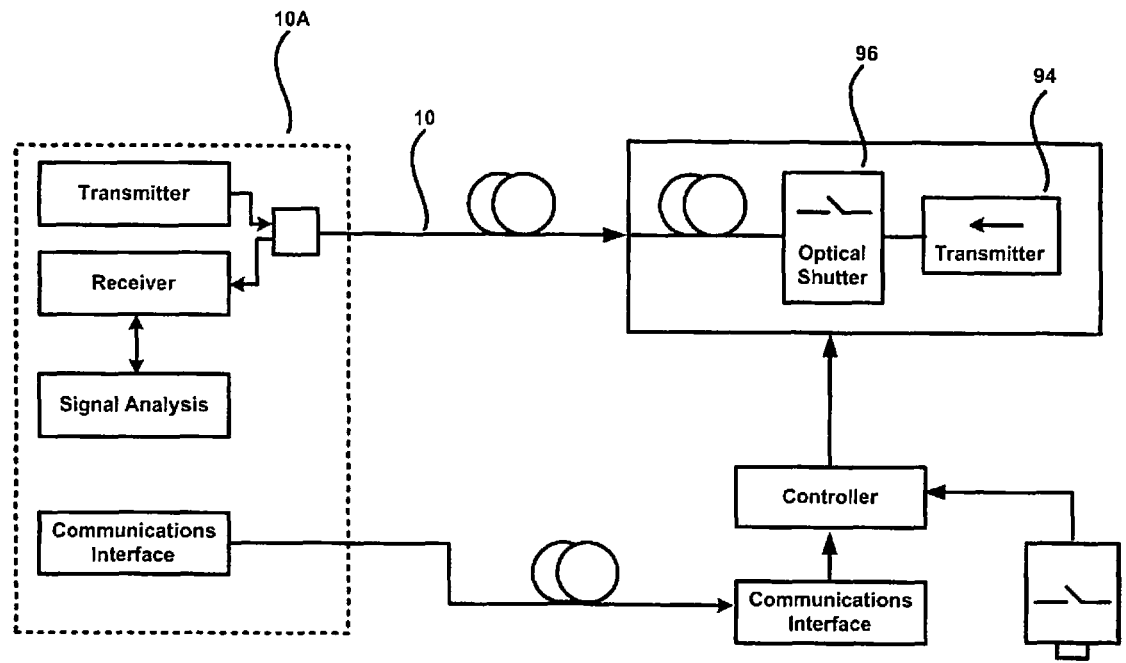
FIG. 22 is a schematic illustration of the operating components which form the elements of the invention for attachment to the fiber to be monitored where the signal in the fiber is applied by optically injecting the signal into the fiber using a third arrangement where an optical shutter is used to control the injected signal.

As shown in FIG. 22 in a third method there is a provided a modification of the direct injection method, differentiated by disabling, by an optical shutter 96A the laser source 94 at the transmit section of the monitoring device while continuing to monitor with the receiver at the monitor device. Alternatively, timing could be such that the transmit signal is sent during off times that are conventional in a pulsed laser device. The expression "pulsed laser" is meant to indicator a laser that varies in amplitude, turns on and off, or one whose optical path is interrupted as a function of time. This allows the monitor system receiver to detect an injected signal in the absence of a monitor signal, and allows more sophisticated messaging in the test signal that is not obscured in the monitor signal.

Figure 23:
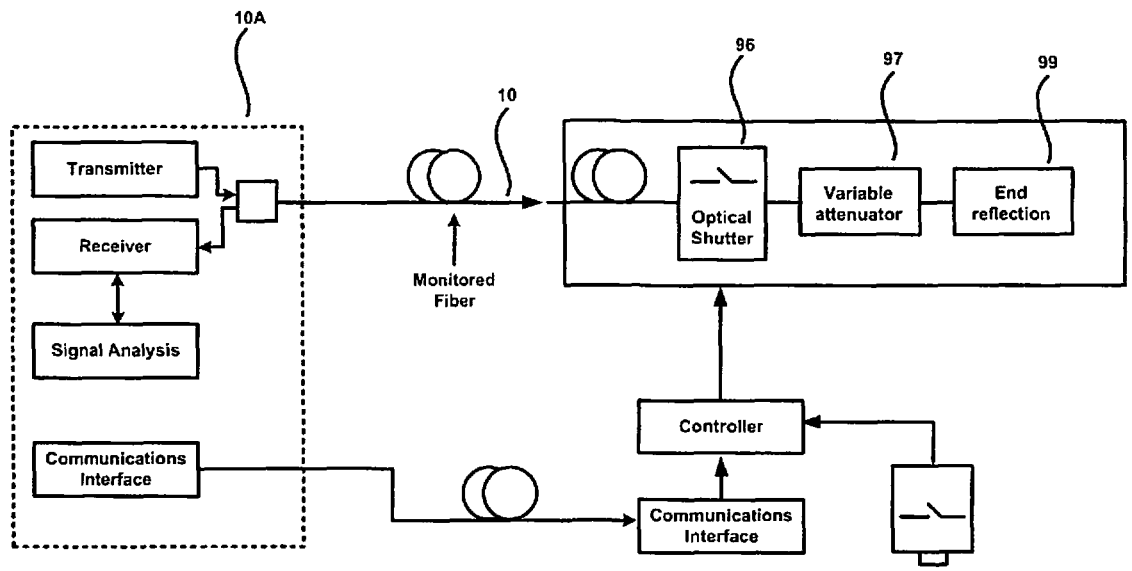
FIG. 23 is a schematic illustration of the operating components which form the elements of the invention for attachment to the fiber to be monitored where the signal in the fiber is applied by optically injecting the signal into the fiber using a third arrangement where an optical shutter, variable attenuator, or combination of the two are used to control the injected signal.

That is, as the end of fiber reflection is problematic if not tamed, this can be used this to advantage as shown in FIG. 23 by controlling it as a signaling mechanism. A low internal reflectance variable attenuator 97, optical switch 98, or both are placed inline with a high reflectance termination 99. This termination can be a simple unterminated or air-gap connector, or it can be a greater reflection such as a reflective deposition on a connector face, such as gold. This reflection can be turned on or off, creating an effective end of line signal that provides both features as described above.

Additionally, the variable attenuator 97 may be modulated such as with a sine wave, causing the end reflection to vary at a pre-determined rate. This can be detected by the signal analysis system 10D and hence adds an additional layer of security as the monitoring device 10A will watch for that frequency at that precise location.

As the DAS monitoring system is a time based system wherein transmission time of flight is indicative of distance from the monitoring apparatus, in a preferred embodiment the test signal source laser 94 in FIG. 21 should be pulsed at a specific time and duration. If this light were to be continuous wave (CW), there would be no indication of location, and the signal obtained by the receiver at the monitoring system 10A would be treated as a DC offset by the monitoring equipment. If the light from source laser 94 is pulsed at the required time relative to the monitor pulse, it can be made to appear at any location along the fiber.

In FIG. 21, a timing signal from the monitor system transmits though an interface 10F a control signal to a communications interface 10E at a remote location, typically the far end, and on to the controller, which signals the transmitter 94 when to fire.

Figure 25:
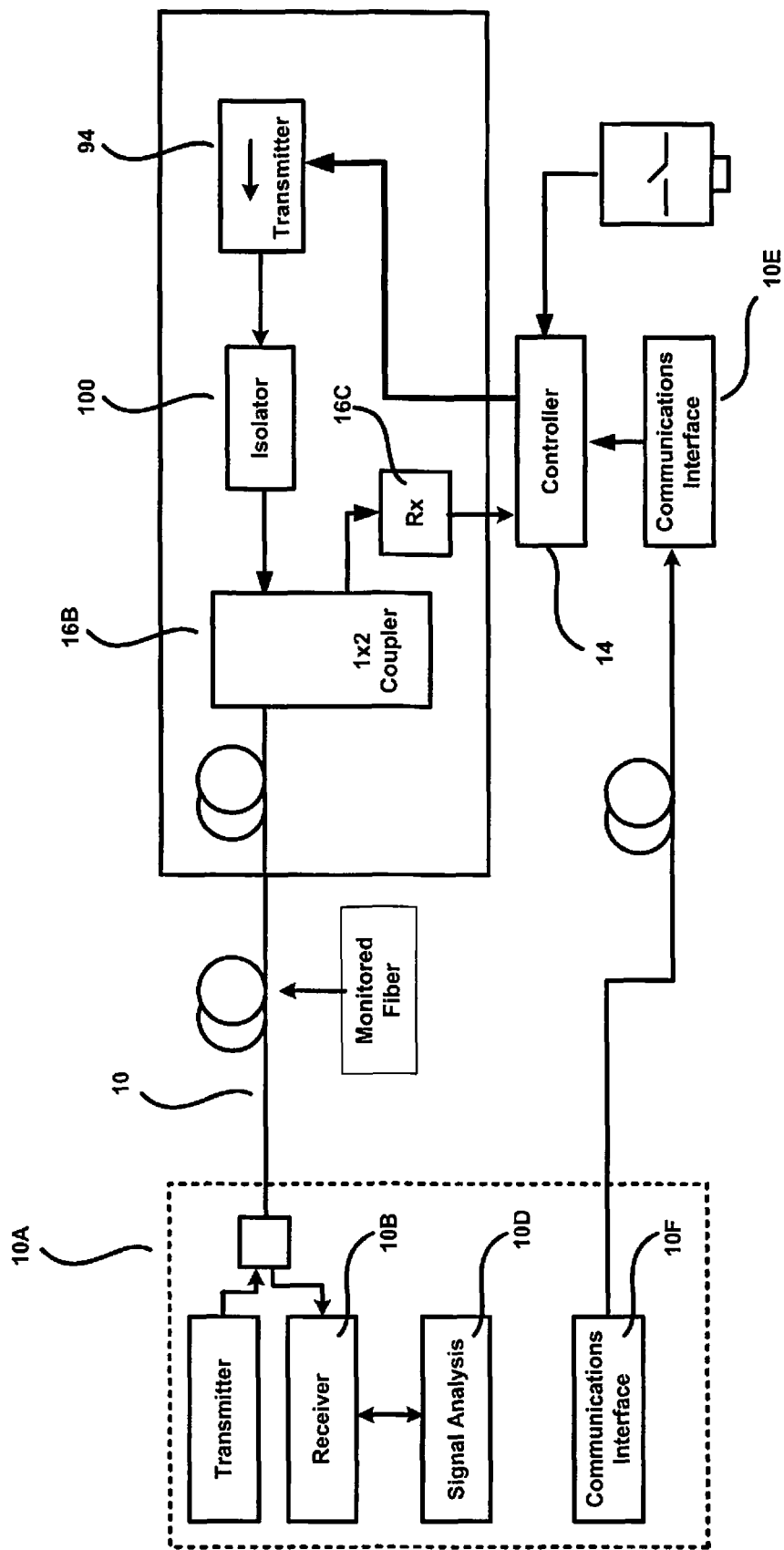
FIG. 25 is a schematic illustration of the operating components which form the elements of the invention for attachment to the fiber to be monitored in a location sensing system where the test signal in the fiber is applied by optically injecting the signal into the fiber at a remote location and timed relative to a monitor pulse to simulate a particular location on the fiber.

Turning now to another alterative arrangement shown in FIG. 25 which is used in a system where no communication is available. In this arrangement, a portion of the monitor signal can be detected using the coupler 16B and receiver 16C of the arrangement shown in FIG. 14. The pulse repetition rate of the monitor signal may be known or measured, and the test signal injected by the transmission laser 94 can be timed accordingly.

For example, in a 10 km installation, one might use a 500 nS monitor pulse from the monitoring system 10A. This causes a roundtrip where the pulse travels the entire distance and reflections return the entire distance for the 10 km in 100 μS. In such an installation, the monitor laser would fire typically at a repetition rate of 10$k$Hz.

For the system utilizing the test signal injected by the laser 94, for example, firing the inject signal 50 μS after the monitor laser fires makes the signal appear as though it is located at the end of the fiber. A 500 nS pulse from the laser 94 thus appears like a reflection. Alternatively, the injected pulse from the pulse can be formed into any shape as described above such as an envelope of sinewaves or a complex waveform.

Additionally, this delay of the pulse from the laser 94 relative to the received pulse from the monitor signal can be adjusted to change the apparent location of the virtual disturbance. As the monitor laser is fired in a continuous frequency, a virtual injected signal from laser 94 can fire prior to receipt of the monitor signal, thus acting to locate the apparent disturbance closer to the monitor system end of the fiber.

For example, after an initial monitor laser pulse is detected by the receiver 16C, where the controller is programed to know that the monitor signal laser will fire every 100 μS, an injection from the test signal laser 94 at a time 50 μS before the expected receipt of all subsequent laser pulses gives the illusion of a disturbance at the midpoint of the fiber. This virtual disturbance, therefore, can therefore be "tuned' to any location along the fiber.

The pertinent specifications of the monitor signal laser need to be reproduced in the test signal injected laser; such as wavelength, spectral width, scattered optical power.

In one embodiment, an optical isolator 100 as shown in FIG. 25 is provided which limits the reflections from the face of the injection laser 94 from launching into the fiber by presenting a low back reflection. As the wavelengths of the monitor signal laser and the injected signal laser are quite close, the isolator 100 keeps incoming monitor laser light passing through the coupler 16B from reaching the laser 94 which can cause interference and destabilization of the laser 94.

Figure 24:
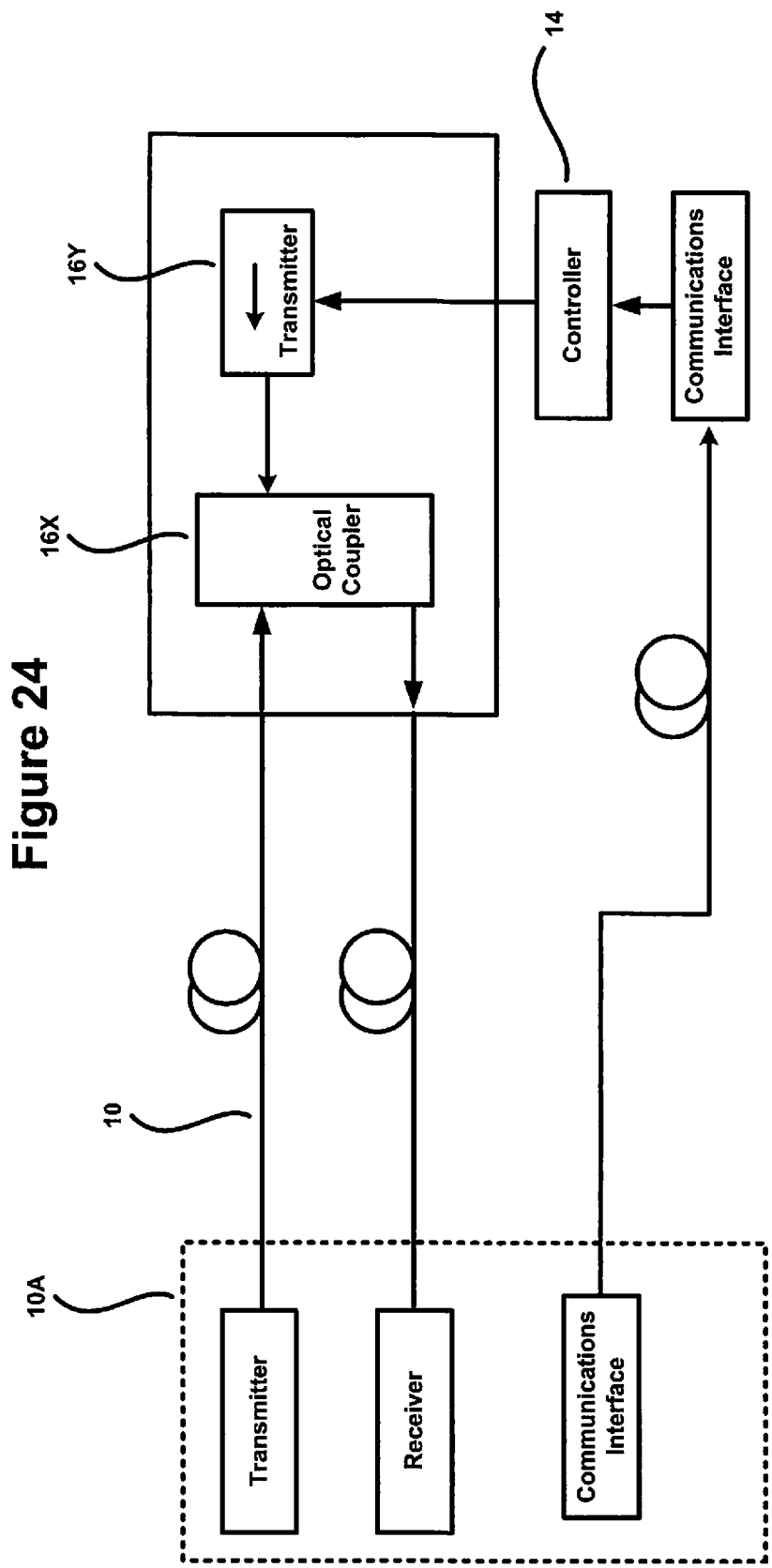
FIG. 24 is a schematic illustration of the operating components which form the elements of the invention for attachment to the fiber to be monitored where the signal in the fiber is applied by optically injecting the signal into the fiber using an optical coupler which combines the monitor signal with the injected signal. This holds true for closed loop systems which are non-locating in regard to the location of the event as well as systems which act to locate the event along the fiber.

FIG. 24 is a schematic illustration of the operating components which form the elements of the invention for attachment to the fiber to be monitored where the signal in the fiber is applied by optically injecting the signal from a transmitter 16Y into the fiber using an optical coupler 16X which combines the monitor signal with the injected signal. This holds true for closed loop systems which are non-locating in regard to the location of the event as well as systems which act to locate the event along the fiber.

In the closed loop system, the monitoring system transmitter injects a light signal into the fiber, which is typically looped back to the receiver. At the loopback point, an optical coupler enables a test signal to be superimposed on the monitor signal, simulating the fluctuation in signal representative of an intrusion or other disturbance.

The invention claimed is:

1. A method for verifying operation of an optical fiber monitoring system comprising:
   using a detection system to detect changes in an optical fiber caused by an event to be monitored by:
      transmitting from a source of light at a transmit location a monitor signal along the optical fiber;
      receiving the monitor signal after transmission along the optical fiber;
      analyzing the monitor signal after transmission along the optical fiber to detect changes therein caused by the event to be monitored;
      and generating an alarm in response to said detected changes which are indicative of an event;
   generating a waveform not caused by the event to be monitored which is shaped and arranged so as to cause changes in the monitor signal to be detected by the detection system when received;
   and periodically optically injecting a test signal corresponding to said waveform into the optical fiber to test operation of the detection system.

2. The method according to claim 1 wherein the test signal is injected into an added length of optical fiber which is connected to the optical fiber through an optical combining device, whereby the test signal is backscattered into the fiber to be monitored.

3. The method according to claim 2 wherein the added length of optical fiber is terminated using a wavelength specific reflection which acts to return just the test signal.

4. The method according to claim 1 wherein the test signal is injected from a laser into the optical fiber at or adjacent a far end of the optical fiber.

5. The method according to claim 1 wherein the test signal is injected from a laser into the optical fiber at a position spaced from a far end of the optical fiber and wherein the signal is transmitted along the optical fiber by reflection from the far end.

6. The method according to claim 1 wherein the test signal is injected into the optical fiber at a location of a loop back for returning the test signal to the detection system by injecting into an optical combining device.

7. The method according to claim 6 wherein, at the loopback, the optical combining device enables the test signal to be superimposed on the monitor signal.

8. The method according to claim 1 wherein the detection system includes a location sensing system which uses timing for locating the event to be monitored relative to a length of the optical fiber and wherein the test signal is injected at a time selected to appear as the event at a predetermined location on the optical fiber.

9. The method according to claim 8 wherein the location sensing system detects reflections of a pulse of a monitor signal from the event at a location on the optical fiber and wherein the test signal is injected at a time selected relative to the pulse of the monitor signal to appear as a reflection at a predetermined location on the optical fiber.

10. The method according to claim 8 wherein the test signal is injected at a far end of the fiber and wherein there is provided a communication system for actuating timing of the test signal injection.

11. The method according to claim 8 wherein the test signal is injected at a remote location of the optical fiber and wherein there is provided a receiver at the remote location for detecting a time of transmission of the monitor signal.

12. A method for verifying operation of an optical fiber monitoring system comprising:
using a detection system to detect changes in an optical fiber caused by an event to be monitored by:
transmitting from a source of light at a transmit location a monitor signal along the optical fiber;
receiving signals after transmission along the optical fiber;
analyzing the signals after transmission along the optical fiber to detect the event to be monitored and to detect by timing of the signals a location of the event along the optical fiber;
and periodically optically injecting a test signal into the fiber to test operation of the detection system;
wherein the test signal is injected at a time selected to appear as the event at a predetermined location on the optical fiber.

13. The method according to claim 12 wherein the test signal is injected at a time selected relative to a pulse of the monitor signal to appear as a reflection at a predetermined location on the optical fiber.

14. The method according to claim 12 wherein the test signal is injected at a far end of the optical fiber and wherein there is provided a communication system for actuating timing of said injecting of the test signal.

15. The method according to claim 12 wherein the test signal is injected at a remote location of the optical fiber and wherein there is provided a receiver at the remote location for detecting a time of transmission of the monitor signal.

16. A method for verifying operation of an optical fiber monitoring system comprising:
using a detection system to detect changes in an optical fiber caused by an event to be monitored by:
transmitting from a source of light at a transmit location a monitor signal along the optical fiber;
analyzing received signals from the optical fiber after transmission along the optical fiber to detect the event to be monitored;
and generating an alarm in response to signals which are indicative of the event to be monitored;
and verifying proper operation of the detection system by:
applying to the optical fiber a generated signal which is not caused by an event to be monitored;
repeatedly applying the generated signal to the optical fiber by an actuator at a predetermined location in response to an instruction to the actuator;
arranging the generated signal so as to be detected by the detection system when received;
analyzing the received signals from the optical fiber after transmission along the optical fiber to detect the generated signal;
and when said generated signal is not detected, actuating a warning that the detection system is not properly operating.

17. The method according to claim 16 wherein the actuator operates to apply said generated signal by physical movement of at least a portion of the fiber.

18. The method according to claim 16 wherein the actuator operates to apply said generated signal by any one or more of bending, shaking, compressing or stretching at least a portion of the optical fiber.

19. The method according to claim 16 wherein the actuator operates to apply said generated signal by energizing an electromagnetic device.

20. The method according to claim 16 wherein the actuator operates to apply said generated signal by heating or cooling the fiber.

21. The method according to claim 16 wherein the generated signal is a waveform.

22. The method according to claim 21 wherein the waveform is representative of one event of a plurality of events to be monitored.

23. The method according to claim 21 wherein the waveform is generated by recording an actual event.

24. The method according to claim 16 wherein the actuator is arranged to optically inject the generated signal into the optical fiber.

25. The method according to claim 24 wherein the actuator is arranged to inject the generated signal into an added length of optical fiber which is connected to the optical fiber to be monitored through an optical combining device whereby a test signal is backscattered into the fiber to be monitored.

26. The method according to claim 24 wherein the actuator is arranged to inject the generated signal at or adjacent a far end of the fiber.

27. The method according to claim 24 wherein the actuator is arranged to inject the generated signal into the fiber at a position spaced from a far end of the fiber and wherein the signal is transmitted along the optical fiber by reflection from the far end.

28. The method according to claim 24 wherein the actuator is arranged to inject the generated signal into the fiber at a location of a loop back for returning the signal to the detection system receiver by injecting into an optical combining device.

29. The method according to claim 16 wherein the instruction to the actuator is generated by a manual trigger.

30. The method according to claim 16 wherein the instruction to the actuator is generated by a self-initiated test at a scheduled or random time.

31. The method according to claim 30 wherein the instruction to the actuator is communicated along the optical fiber to the actuator to effect said operating of the actuator and there is provided a coupler on the optical fiber to extract the instruction from other signals in the optical fiber.

32. The method according to claim 16 wherein the actuator comprises an optical shutter.

33. A method for verifying operation of an optical fiber monitoring system comprising:
using a detection system to detect changes in an optical fiber caused by an event to be monitored by:
transmitting from a source of light at a transmit location a monitor signal along the optical fiber;
analyzing received signals from the optical fiber after transmission along the optical fiber to detect the event to be monitored;
and generating an alarm in response to signals which are indicative of the event to be monitored;
and verifying proper operation of the detection system by:
applying to the optical fiber a generated signal which is not caused by an event to be monitored;
repeatedly applying the generated signal to the optical fiber by an actuator at a predetermined location in response to an instruction to the actuator;
arranging the generated signal so as to be detected by the detection system when received;

analyzing the received signals from the optical fiber after transmission along the optical fiber to detect the generated signal;

wherein generated signal contains a recognizable signature for detection by said detection system so as to distinguish at said detection system the generated signal from said event to be monitored;

and when said generated signal is not detected, actuating a warning that the detection system is not properly operating.

* * * * *